(12) United States Patent
Kato

(10) Patent No.: US 8,514,496 B2
(45) Date of Patent: Aug. 20, 2013

(54) HIGH ZOOM-RATIO ZOOM LENS SYSTEM

(75) Inventor: Koji Kato, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 107 days.

(21) Appl. No.: 13/170,612

(22) Filed: Jun. 28, 2011

(65) Prior Publication Data

US 2012/0002298 A1    Jan. 5, 2012

(30) Foreign Application Priority Data

Jul. 1, 2010    (JP) .................................. 2010-151280

(51) Int. Cl.
*G02B 15/14*    (2006.01)
(52) U.S. Cl.
USPC .......................................... 359/687; 359/683
(58) Field of Classification Search
CPC ...................................................... G02B 15/14
USPC ................................................ 359/687, 683
See application file for complete search history.

(56) References Cited

U.S. PATENT DOCUMENTS

| | | |
|---|---|---|
| 2006/0072213 A1 | 4/2006 | Shibayama et al. |
| 2009/0244720 A1 | 10/2009 | Yamaguchi |
| 2010/0238563 A1* | 9/2010 | Miyajima ..................... 359/687 |

FOREIGN PATENT DOCUMENTS

| | | |
|---|---|---|
| JP | 2000-330016 | 11/2000 |
| JP | 2005-331697 | 12/2005 |
| JP | 2006-106191 | 4/2006 |
| JP | 2009-58980 | 3/2009 |
| JP | 2009-175324 | 8/2009 |
| JP | 2009-244443 | 10/2009 |

OTHER PUBLICATIONS

U.S. Appl. No. 13/170,619 to Koji Kato, filed Jun. 28, 2011.

* cited by examiner

*Primary Examiner* — William Choi
(74) *Attorney, Agent, or Firm* — Greenblum & Bernstein, P.L.C.

(57) ABSTRACT

A high-ratio zoom lens system includes a positive first lens group, a negative second lens group, a positive third lens group, and a positive fourth lens group, in that order from the object. Upon zooming from the short focal length extremity to the long focal length extremity, the first through fourth lens groups move along the optical axis of the zoom lens system while increasing the distance between the first and second lens groups, and decreasing the distance between the second and third lens groups. The following conditions are satisfied:

$0.9 < f3/f4 < 1.3$ and $-3.85 < f123t/f4 < -3.04$ wherein f3 designates the focal length of the third lens group, f4 designates the focal length of the fourth lens group, and f123t designates the combined focal length of the first, second and third lens groups when an object at infinity is in an in-focus state at the long focal length extremity.

13 Claims, 29 Drawing Sheets

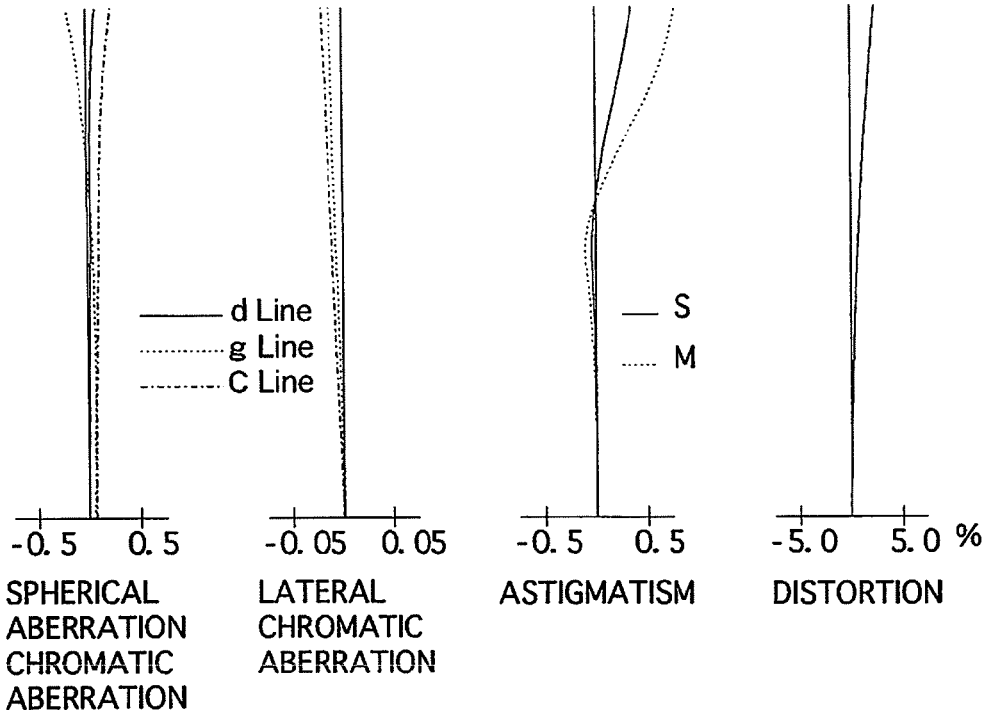
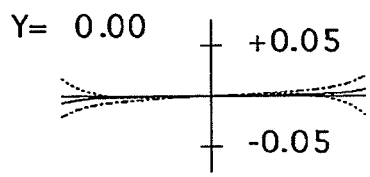
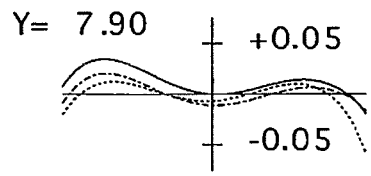
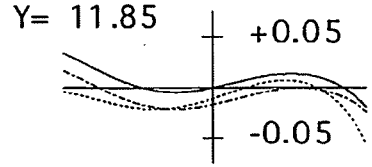
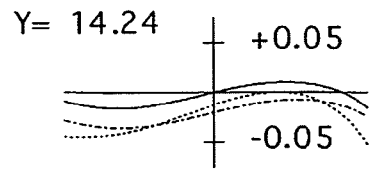

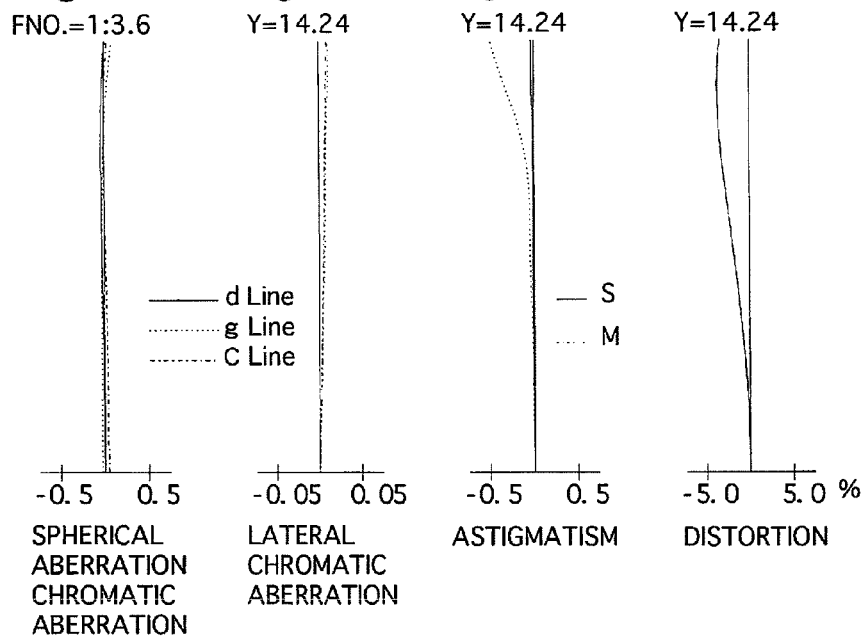
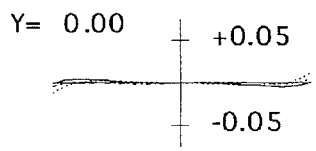
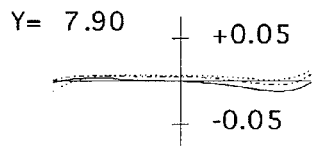
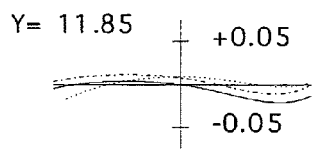
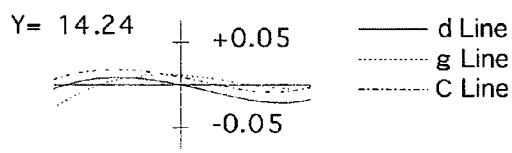

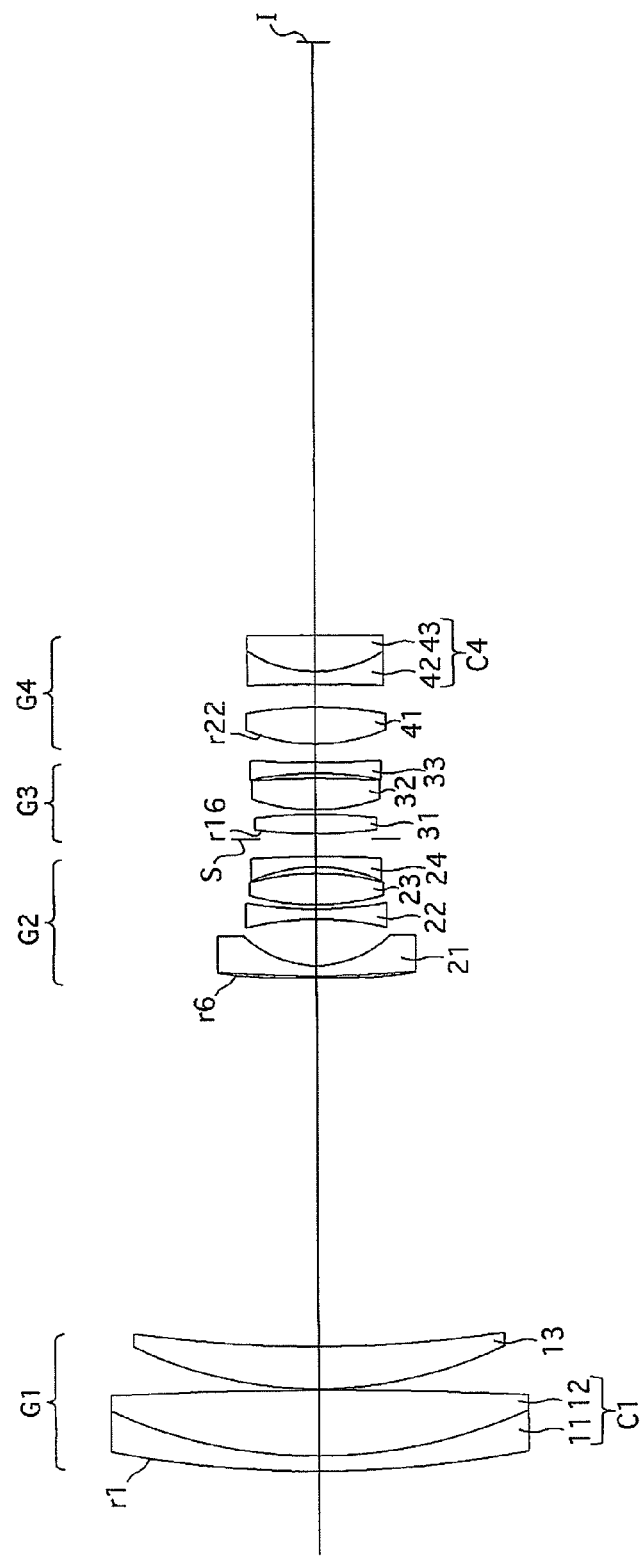

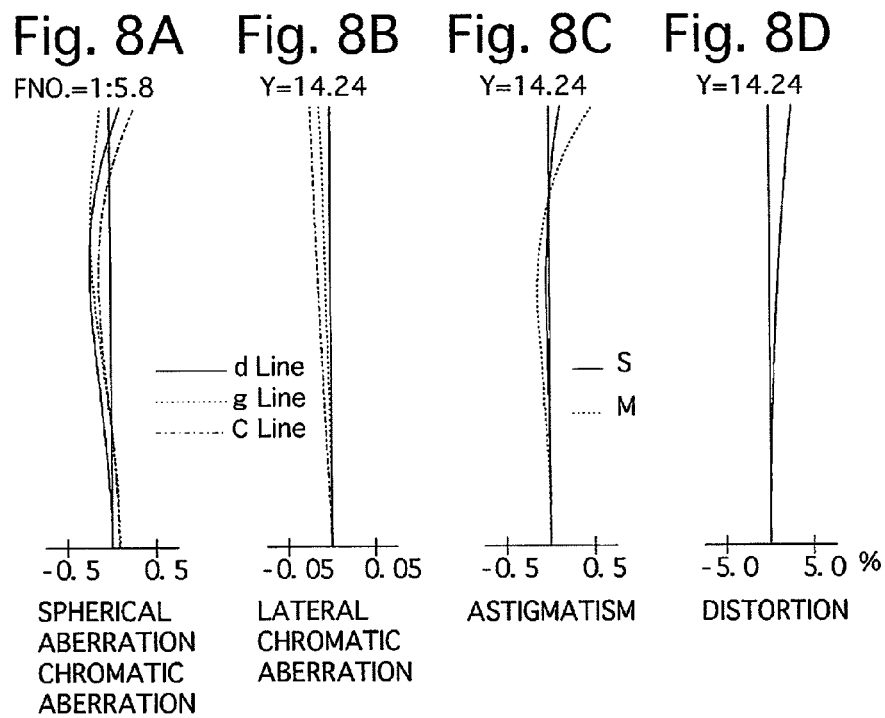
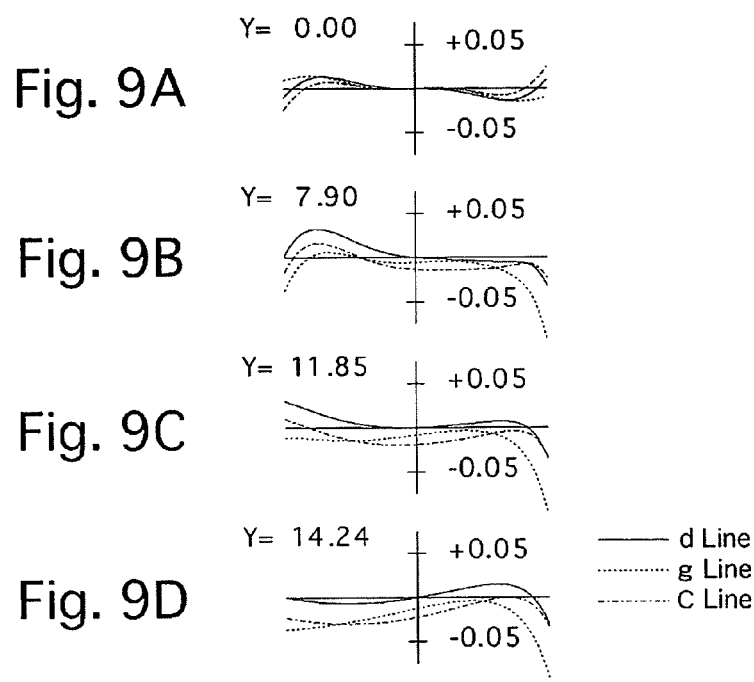

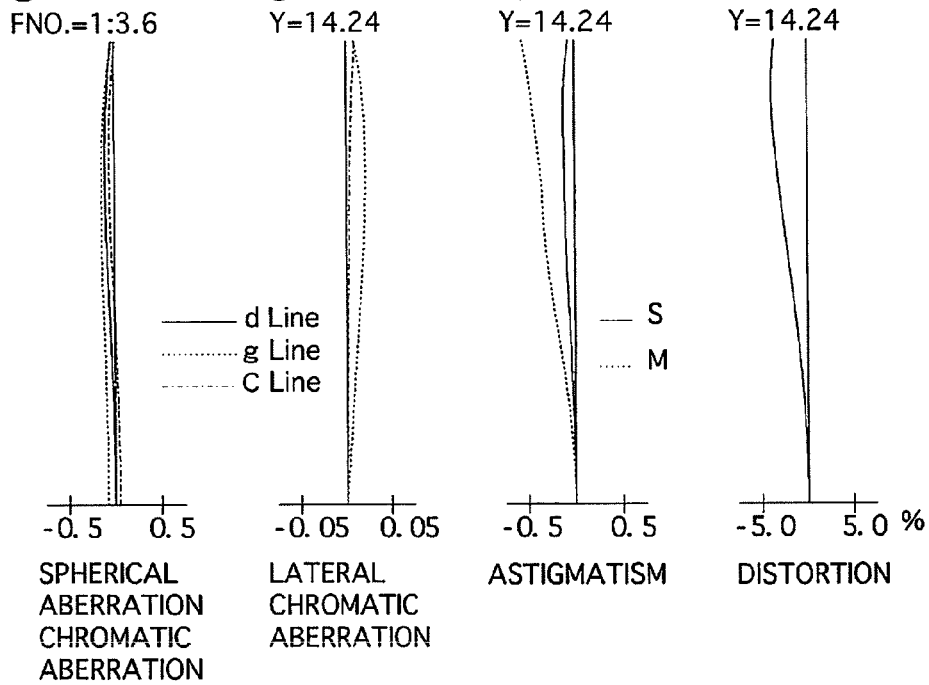
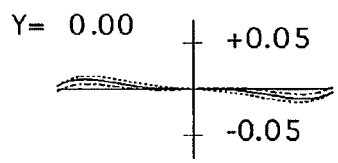
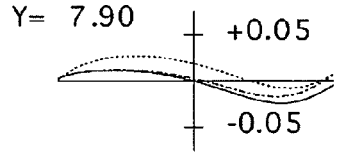
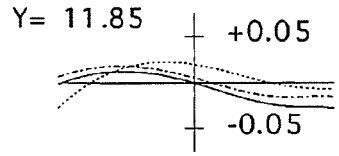
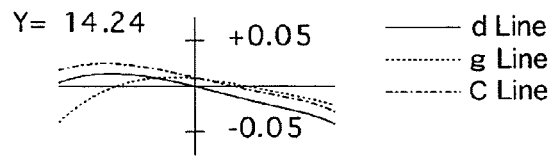

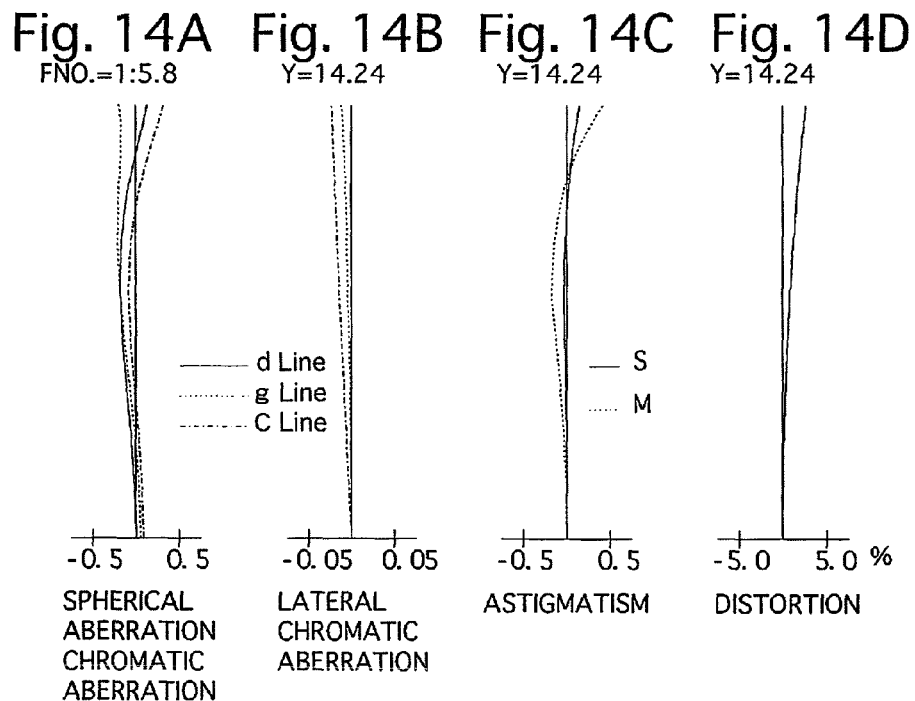
Fig. 14A FNO.=1:5.8 — SPHERICAL ABERRATION CHROMATIC ABERRATION
Fig. 14B Y=14.24 — LATERAL CHROMATIC ABERRATION
Fig. 14C Y=14.24 — ASTIGMATISM
Fig. 14D Y=14.24 — DISTORTION
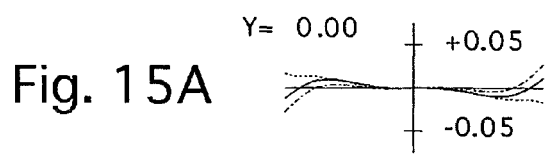
Fig. 15A  Y= 0.00
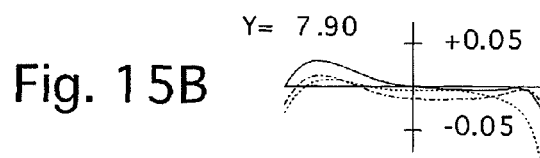
Fig. 15B  Y= 7.90
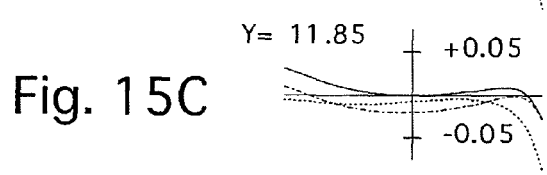
Fig. 15C  Y= 11.85
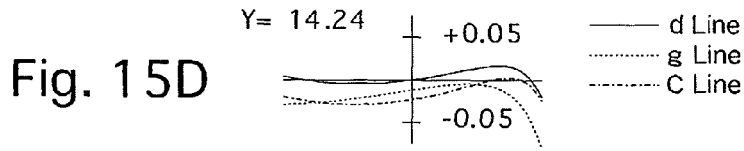
Fig. 15D  Y= 14.24

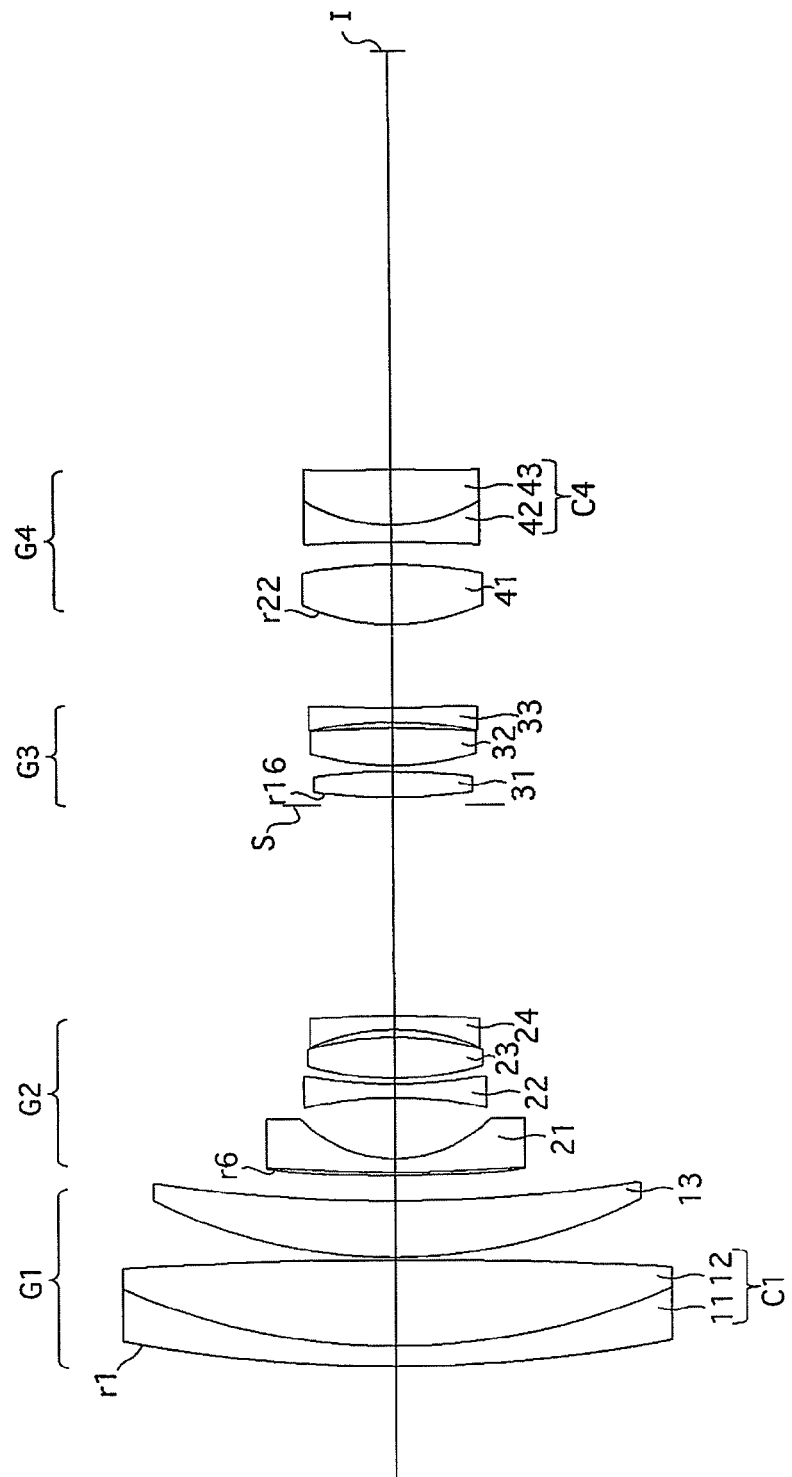

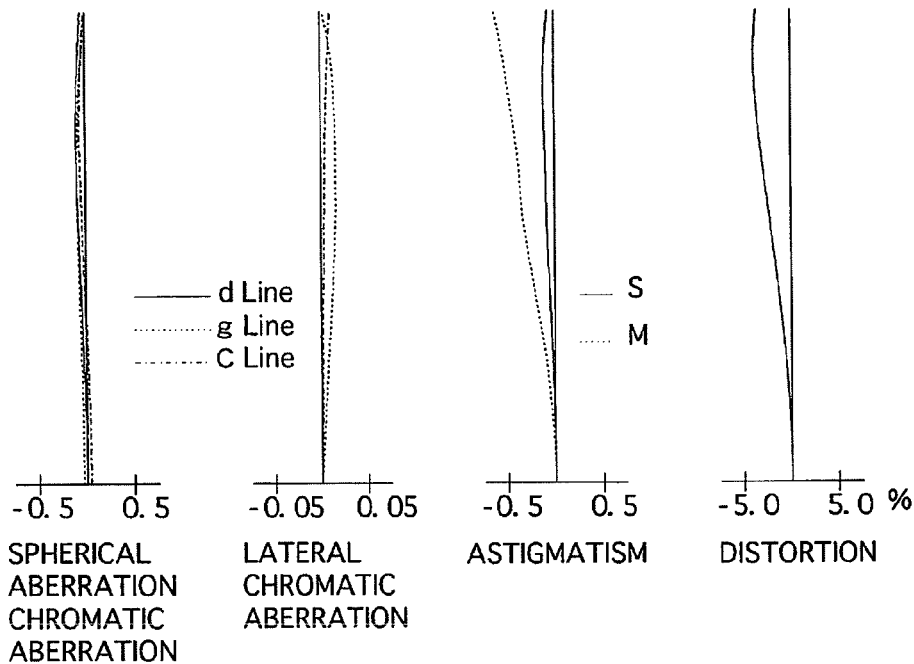
Fig. 17A FNO.=1:3.6 — SPHERICAL ABERRATION CHROMATIC ABERRATION
Fig. 17B Y=14.24 — LATERAL CHROMATIC ABERRATION
Fig. 17C Y=14.24 — ASTIGMATISM
Fig. 17D Y=14.24 — DISTORTION
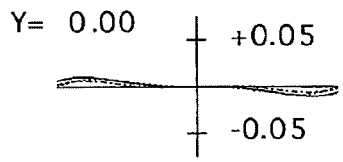
Fig. 18A Y= 0.00
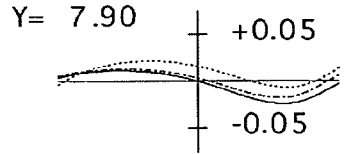
Fig. 18B Y= 7.90
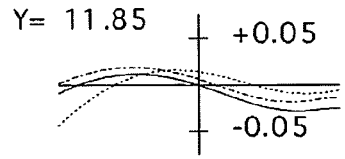
Fig. 18C Y= 11.85
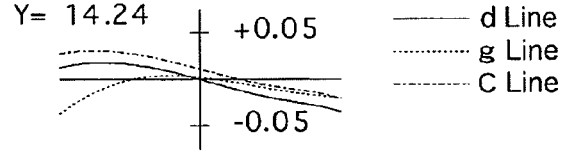
Fig. 18D Y= 14.24

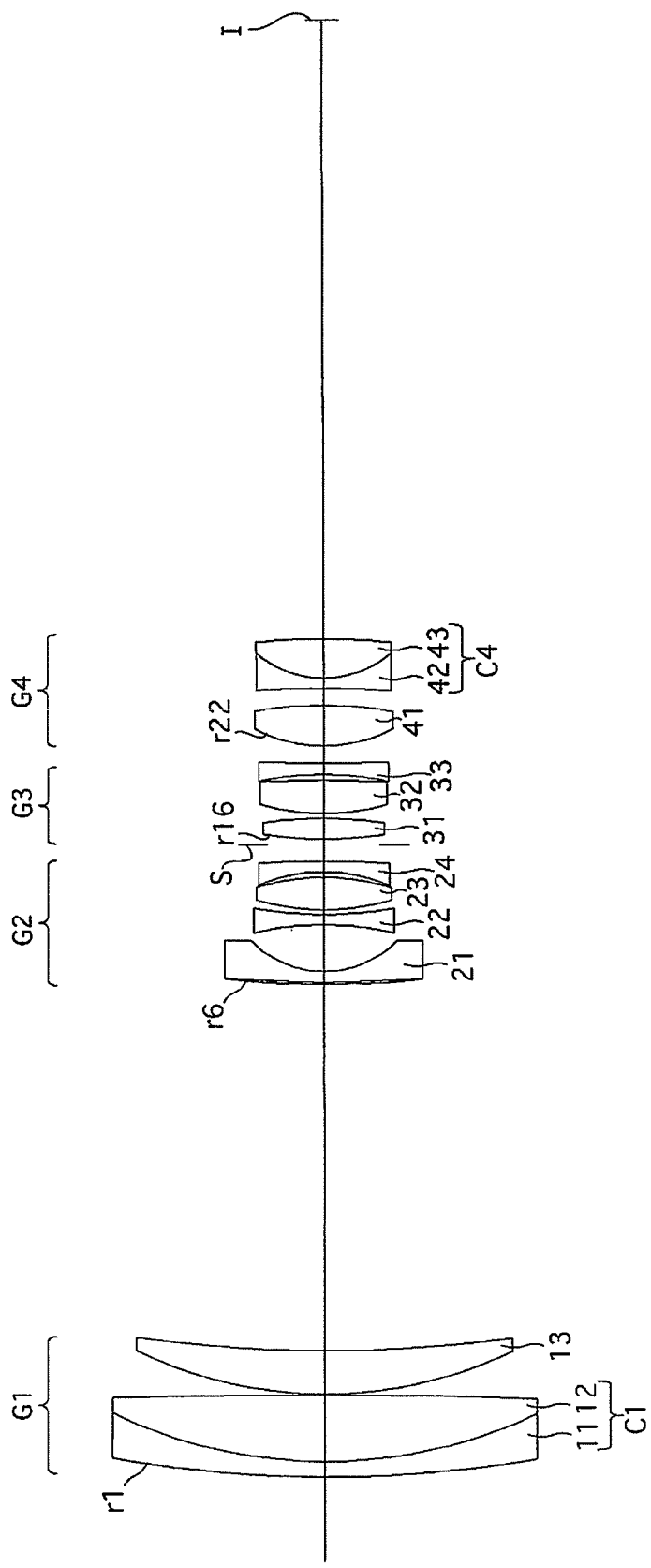

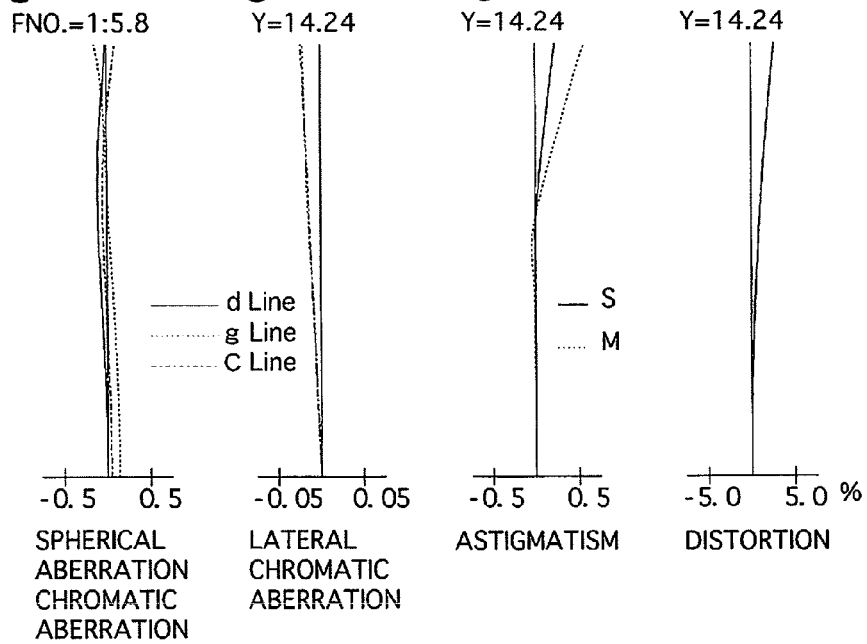
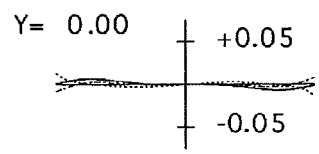
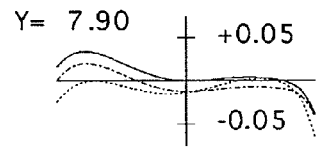
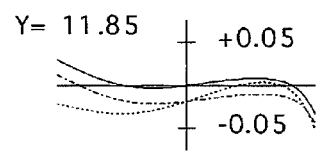
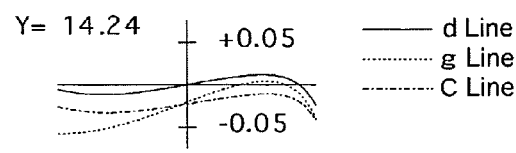

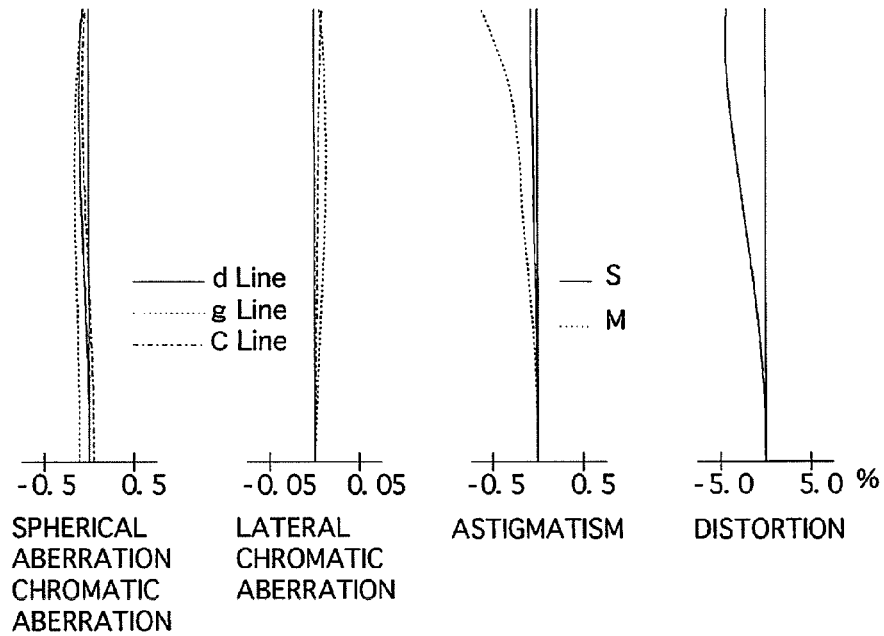
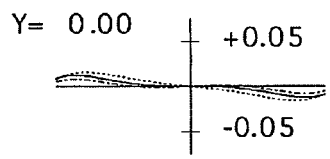
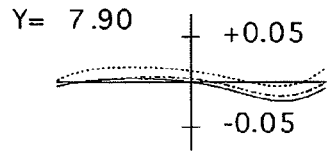
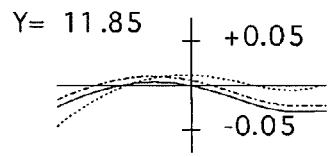
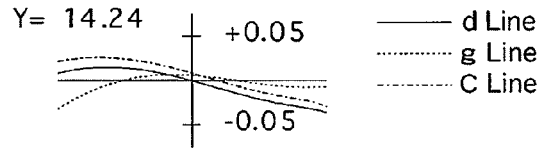

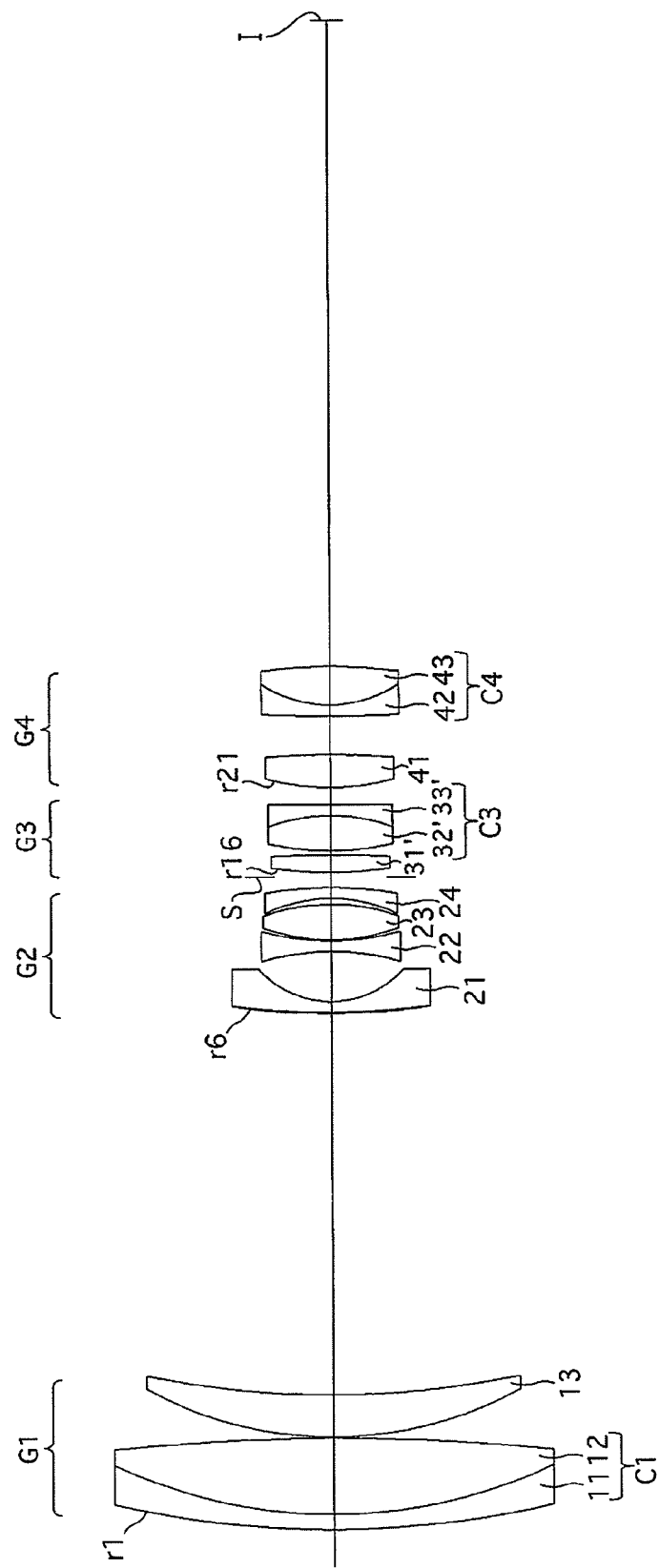

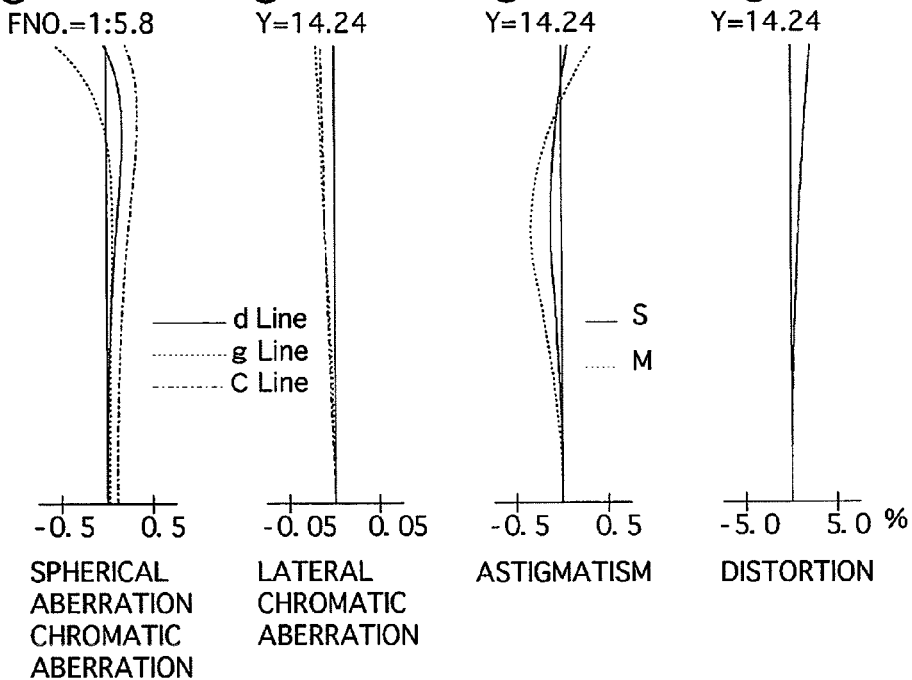
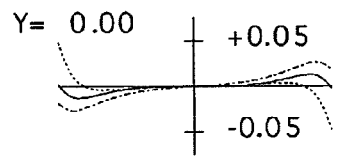
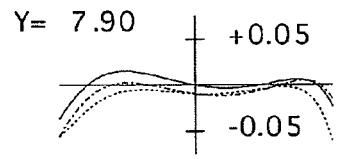
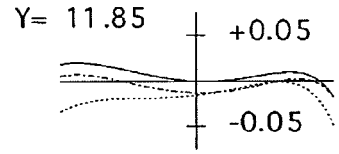
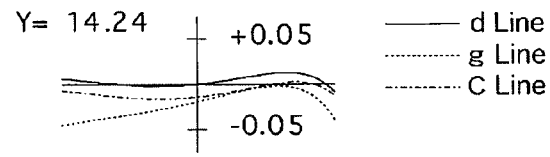

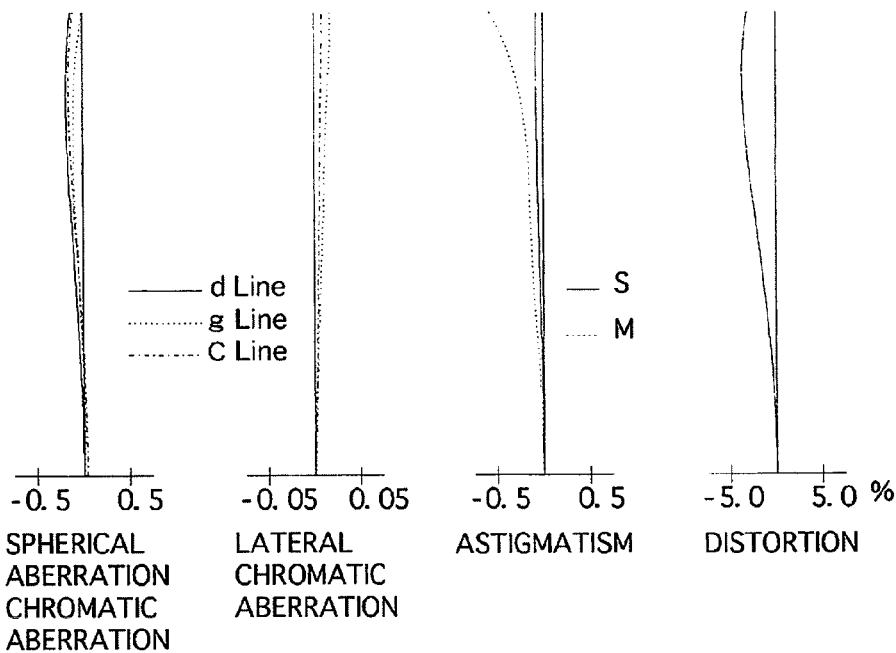
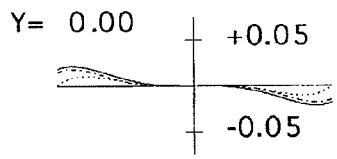
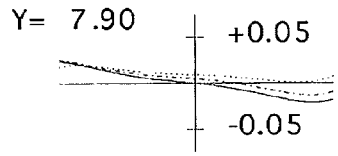
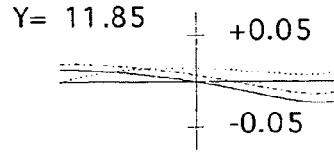
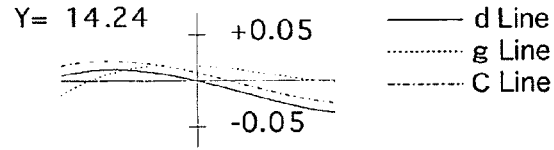

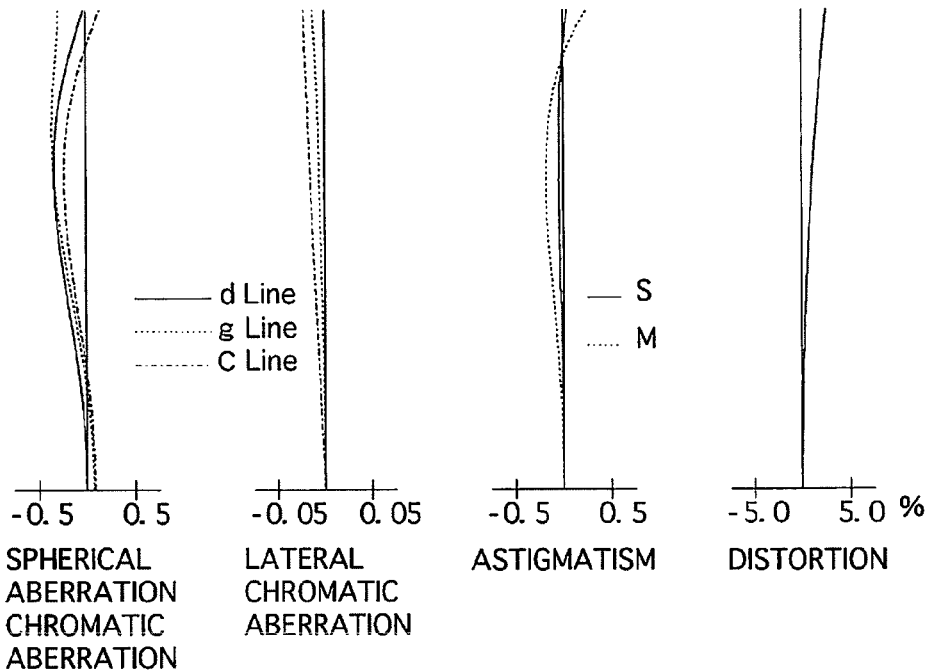

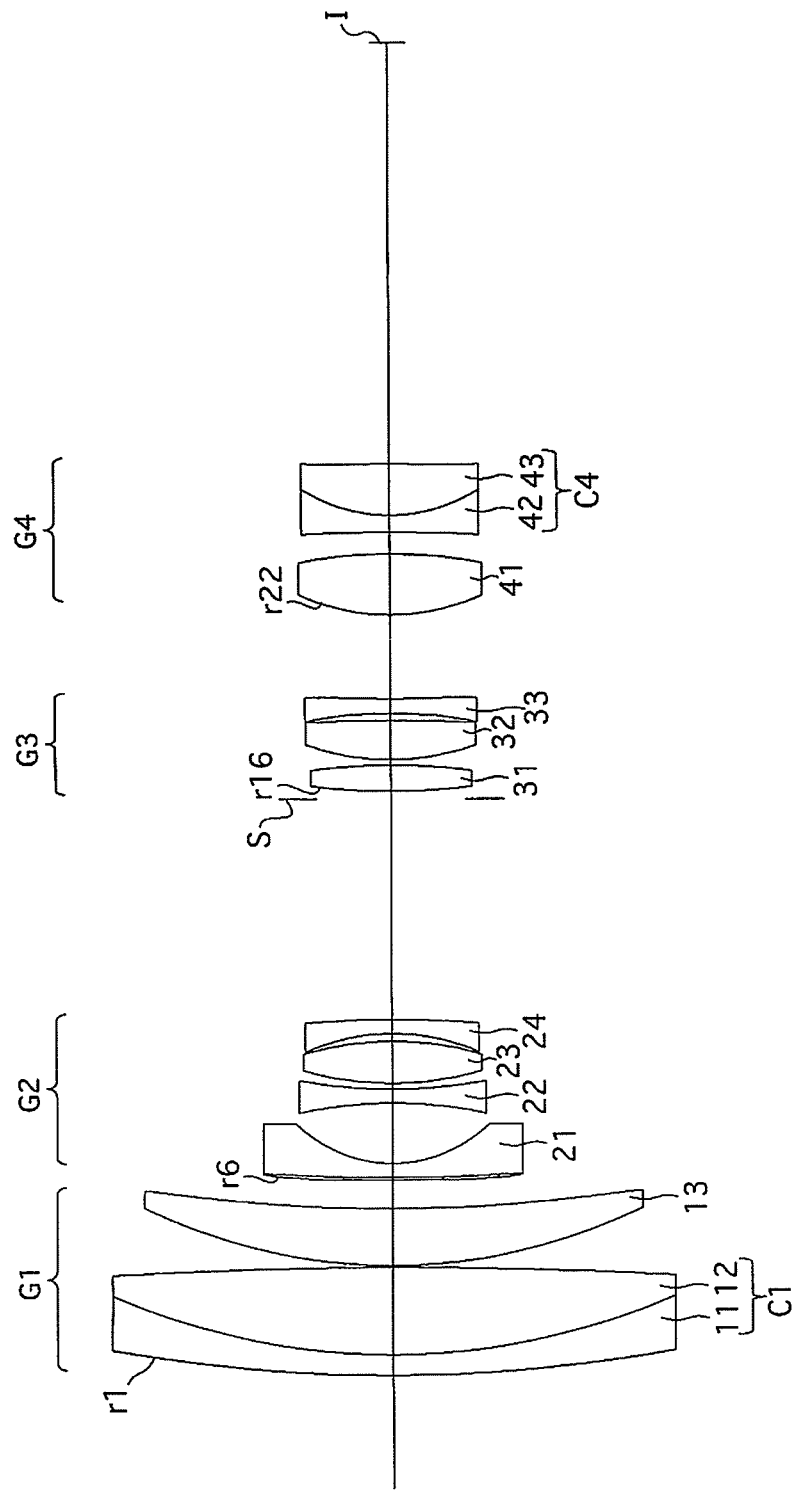

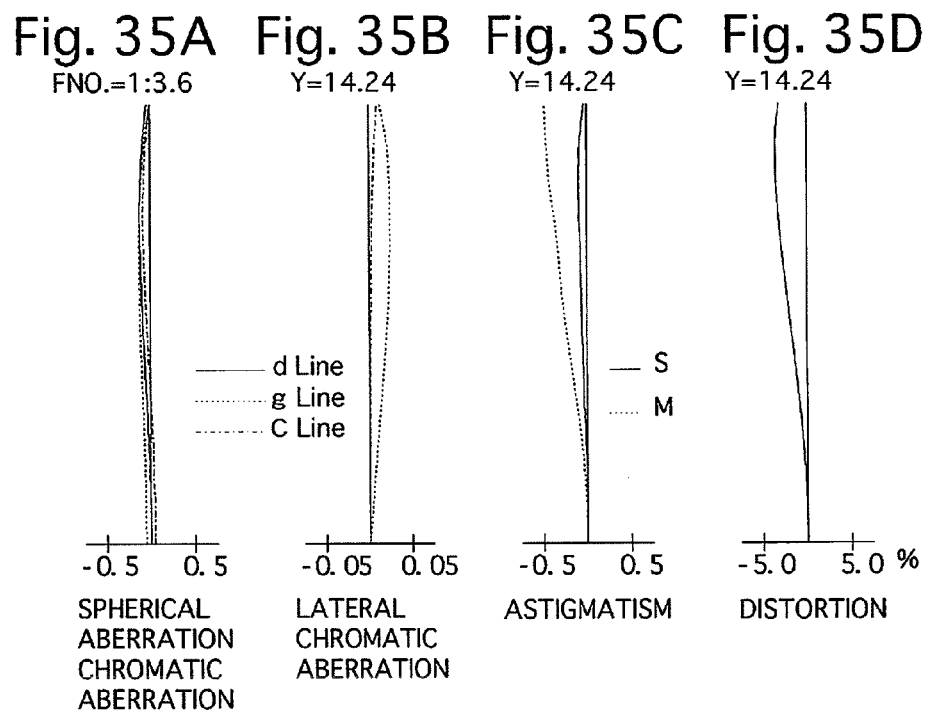
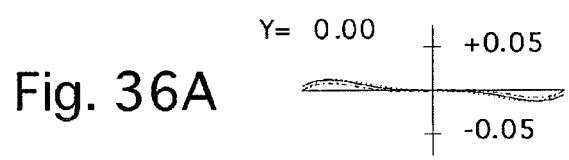
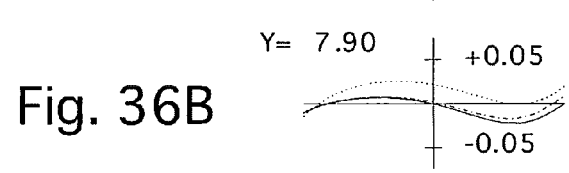
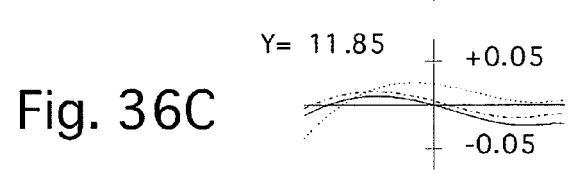
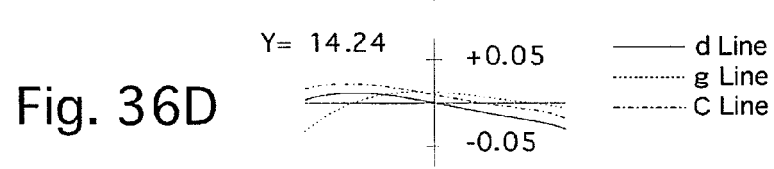

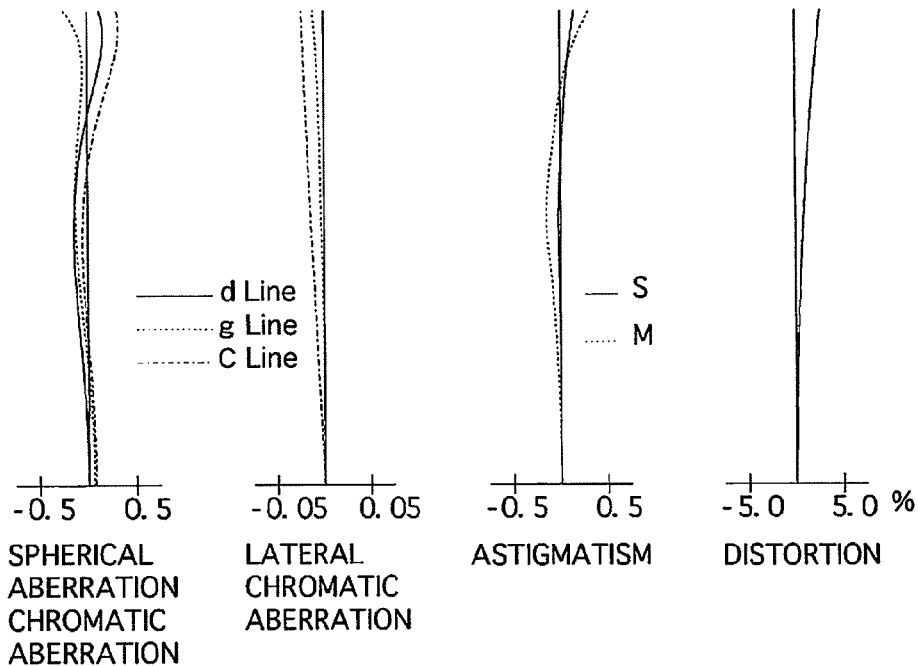
Fig. 38A FNO.=1:5.8
Fig. 38B Y=14.24
Fig. 38C Y=14.24
Fig. 38D Y=14.24
— d Line
······ g Line
--- C Line
— S
····· M
-0.5  0.5
SPHERICAL ABERRATION CHROMATIC ABERRATION
-0.05  0.05
LATERAL CHROMATIC ABERRATION
-0.5  0.5
ASTIGMATISM
-5.0  5.0 %
DISTORTION
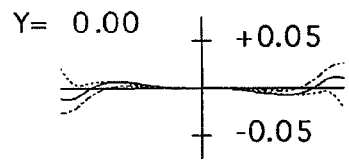
Fig. 39A   Y= 0.00   +0.05 / -0.05
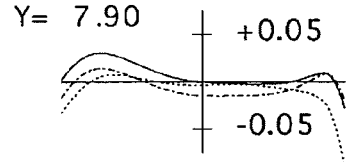
Fig. 39B   Y= 7.90   +0.05 / -0.05
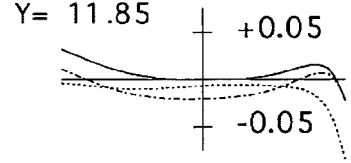
Fig. 39C   Y= 11.85   +0.05 / -0.05
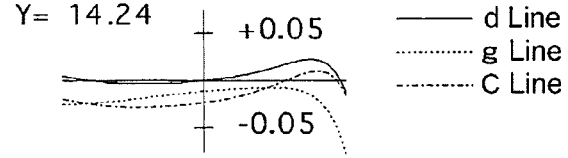
Fig. 39D   Y= 14.24   +0.05 / -0.05
— d Line
······ g Line
--- C Line

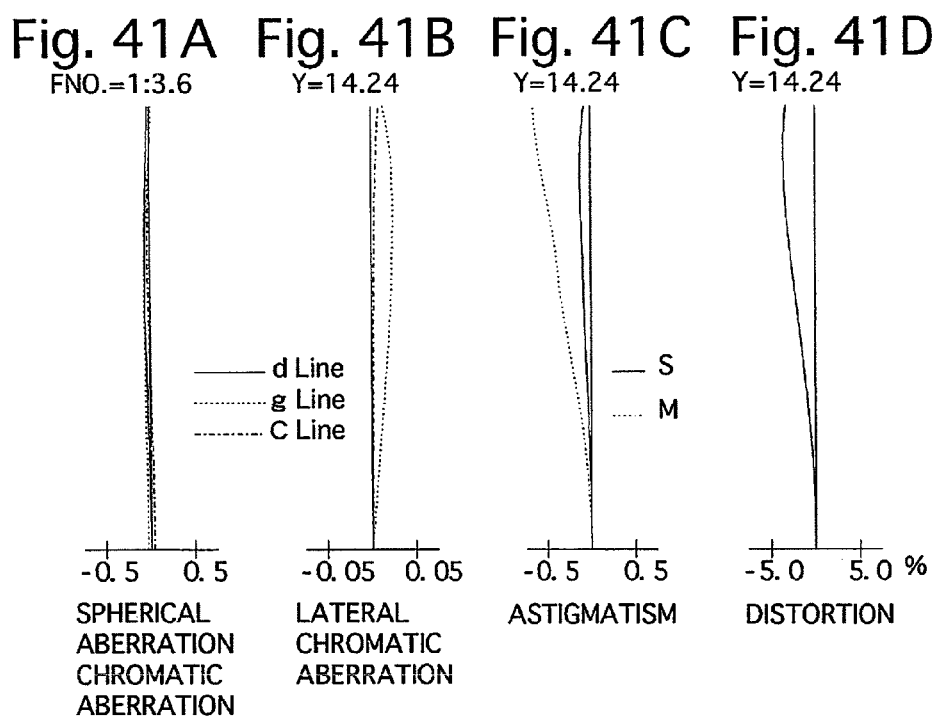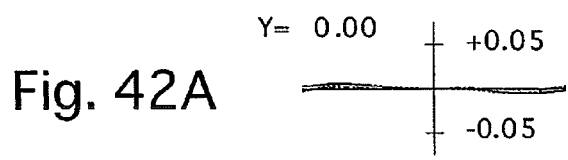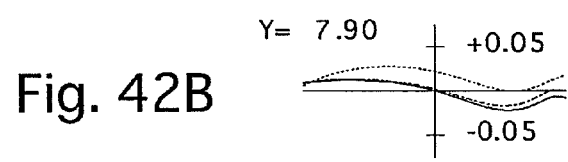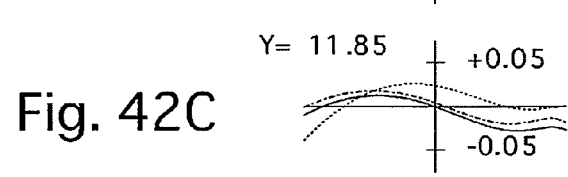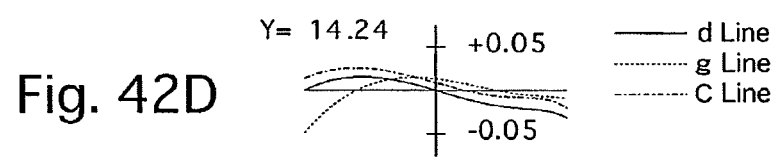

HIGH ZOOM-RATIO ZOOM LENS SYSTEM

BACKGROUND OF THE INVENTION

1. Field of the Invention

The present invention relates to a high zoom-ratio zoom lens system that is suitable for an imaging optical system of a digital camera that is provided with a small (compact) image sensor.

2. Description of Related Art

In recent years, technical advancement in providing higher zoom ratios has occurred in zoom lens systems, while the demand for further miniaturization in zoom lens systems due to further miniaturization of the camera body has also increased. For example, zoom lens systems having five lens groups, i.e., a positive lens group, a negative lens group, a positive lens group, a negative lens group and a positive lens group (Japanese Unexamined Patent Publication Nos. 2009-244443 and 2009-175324), and zoom lens systems having four lens groups, i.e., a positive lens group, a negative lens group, a positive lens group and a positive lens group (Japanese Unexamined Patent Publication Nos. 2009-58980 and 2005-331697), are known in the art as relatively high zoom-ratio zoom lens systems.

However, in zoom lens systems having five lens groups (i.e., a positive lens group, a negative lens group, a positive lens group, a negative lens group and a positive lens group) as disclosed in the above-mentioned Japanese Unexamined Patent Publication Nos. 2009-244443 and 2009-175324, due to being such zoom lens systems of five lens groups, a problem occurs with an increase in the size of the zoom lens system becoming larger due to an increased number of components and further complexity of the mechanical structures therefor, which makes it very difficult to achieve a compact zoom lens system.

Furthermore, in zoom lens systems having four lens groups (i.e., a positive lens group, a negative lens group, a positive lens group and a positive lens group), disclosed in the above-mentioned Japanese Unexamined Patent Publication No. 2009-58980, the overall length of the zoom lens system at the short focal length extremity is great; and, the zoom lens system is not sufficiently miniaturized. Furthermore, in the zoom lens system disclosed in the above-mentioned Japanese Unexamined Patent Publication No. 2005-331697, although miniaturization is achieved, the focal length at the long focal length extremity is 120 mm and the zoom ratio is 6.4:1, which is somewhat small.

SUMMARY OF THE INVENTION

The present invention provides a compact, high-quality high zoom-ratio zoom lens system that achieves an angle-of-view of approximately 76 degrees at the short focal length extremity, a zoom ratio of approximately 7.0 through 7.3:1, and has a back focal distance that is long enough for use in an SLR camera having an interchangeable lens.

According to an aspect of the present invention, there is provided a high-ratio zoom lens system including a positive first lens group (hereinafter, a first lens group), a negative second lens group (hereinafter, a second lens group), a positive third lens group (hereinafter, a third lens group), and a positive fourth lens group (hereinafter, a fourth lens group), in that order from the object.

Upon zooming from the short focal length extremity to the long focal length extremity, the first through fourth lens groups move along the optical axis thereof, while the distance between the first and second lens groups increases, and the distance between the second and third lens groups decreases.

The high-ratio zoom lens system satisfies the following conditions:

$$0.9 < f3/f4 < 1.3 \qquad (1)$$

$$-3.85 < f123t/f4 < -3.04 \qquad (2)$$

wherein f3 designates the focal length of the third lens group; f4 designates the focal length of the fourth lens group; and f123t designates the combined focal length of the first, second and third lens groups, when an object at infinity is in an in-focus state at the long focal length extremity.

The second lens group is preferably constituted as a focusing lens group (to perform focusing on an object at a closer distance from infinity by advancing the second lens group), and the high-ratio zoom lens system satisfies the following condition:

$$55 < R1b/d_{1-2} < 70 \qquad (3)$$

wherein R1b designates the radius of curvature of the image-side surface of the most image-side lens element in the first lens group; and, $d_{1-2}$ designates the distance between the first lens group and the second lens group when an object at infinity is in an in-focus state at the short focal length extremity (i.e., the distance on the optical axis between the most object-side surface of the first lens group and the most image-side of the second lens group).

The fourth lens group preferably includes a positive lens element, and a cemented lens formed from a negative lens element and a positive lens element, in that order from the object.

The high-ratio zoom lens system preferably satisfies the following condition:

$$0.15 < f4p1/ft < 0.35 \qquad (4)$$

wherein f4p1 designates the focal length of the object-side positive lens element in the fourth lens group; and, ft designates the entire focal length of the high-ratio zoom lens system at the long focal length extremity.

The above object-side positive lens element of the fourth lens group preferably includes an aspherical surface on the image side thereof.

The high-ratio zoom lens system preferably satisfies the following condition:

$$-0.67 < \beta 2t < -0.62 \qquad (5)$$

wherein β2t designates the lateral magnification of the second lens group when an object at infinity is in an in-focus state at the long focal length extremity.

According to another aspect of the present invention, there is provided a high-ratio zoom lens system including a positive first lens group, a negative second lens group, a positive third lens group, and a positive fourth lens group, in that order from the object. Upon zooming from the short focal length extremity to the long focal length extremity, the first through fourth lens groups move along the optical axis thereof, while the distance between the first and second lens groups increases, and the distance between the second and third lens groups decreases.

The fourth lens group includes a positive lens element, and a cemented lens formed from a negative lens element and a positive lens element, in that order from the object.

The high-ratio zoom lens system satisfies the following condition:

$$0.15 < f4p1/ft < 0.35 \qquad (4)$$

wherein f4p1 designates the focal length of the object-side in the fourth lens group; and, ft designates the entire focal length of the high-ratio zoom lens system at the long focal length extremity.

According to the present invention, a compact, high-quality high zoom-ratio zoom lens system can be achieved which has an angle-of-view of approximately 76 degrees at the short focal length extremity, a zoom ratio of approximately 7.0 through 7.3:1, and has a back focal distance that is long enough for use in an SLR camera having an interchangeable lens.

The present disclosure relates to subject matter contained in Japanese Patent Application No. 2010-151280 (filed on Jul. 1, 2010) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1;

FIGS. 3A, 3B, 3C and 3D show various lateral aberrations that occurred in the lens arrangement shown in FIG. 1;

FIGS. 5A, 5B, 5C and 5D show various aberrations that occurred in the lens arrangement shown in FIG. 4;

FIGS. 6A, 6B, 6C and 6D show various lateral aberrations that occurred in the lens arrangement shown in FIG. 4;

FIG. 7 shows a lens arrangement of a second numerical embodiment of the high zoom-ratio zoom lens system, according to the present invention, when an object at infinity is in an in-focus state at the long focal length extremity;

FIGS. 8A, 8B, 8C and 8D show various aberrations that occurred in the lens arrangement shown in FIG. 7;

FIGS. 9A, 9B, 9C and 9D show various lateral aberrations that occurred in the lens arrangement shown in FIG. 7;

FIGS. 11A, 11B, 11C and 11D show various aberrations that occurred in the lens arrangement shown in FIG. 10;

FIGS. 12A, 12B, 12C and 12D show various lateral aberrations that occurred in the lens arrangement shown in FIG. 10;

FIGS. 14A, 14B, 14C and 14D show various aberrations that occurred in the lens arrangement shown in FIG. 13;

FIGS. 15A, 15B, 15C and 15D show various lateral aberrations that occurred in the lens arrangement shown in FIG. 13;

FIG. 16 shows a lens arrangement of the third numerical embodiment of the high zoom-ratio zoom lens system, according to the present invention, when an object at infinity is in an in-focus state at the short focal length extremity;

FIGS. 17A, 17B, 17C and 17D show various aberrations that occurred in the lens arrangement shown in FIG. 16;

FIGS. 18A, 18B, 18C and 18D show various lateral aberrations that occurred in the lens arrangement shown in FIG. 16;

FIG. 19 shows a lens arrangement of a fourth numerical embodiment of the high zoom-ratio zoom lens system, according to the present invention, when an object at infinity is in an in-focus state at the long focal length extremity;

FIGS. 20A, 20B, 20C and 20D show various aberrations that occurred in the lens arrangement shown in FIG. 19;

FIGS. 21A, 21B, 21C and 21D show various lateral aberrations that occurred in the lens arrangement shown in FIG. 19;

FIGS. 23A, 23B, 23C and 23D show various aberrations that occurred in the lens arrangement shown in FIG. 22;

FIGS. 24A, 24B, 24C and 24D show various lateral aberrations that occurred in the lens arrangement shown in FIG. 22;

FIG. 25 shows a lens arrangement of a fifth numerical embodiment of the high zoom-ratio zoom lens system, according to the present invention, when an object at infinity is in an in-focus state at the long focal length extremity;

FIGS. 26A, 26B, 26C and 26D show various aberrations that occurred in the lens arrangement shown in FIG. 25;

FIGS. 27A, 27B, 27C and 27D show various lateral aberrations that occurred in the lens arrangement shown in FIG. 25;

FIGS. 29A, 29B, 29C and 29D show various aberrations that occurred in the lens arrangement shown in FIG. 28;

FIGS. 30A, 30B, 30C and 30D show various lateral aberrations that occurred in the lens arrangement shown in FIG. 28;

FIGS. 32A, 32B, 32C and 32D show various aberrations that occurred in the lens arrangement shown in FIG. 31;

FIGS. 33A, 33B, 33C and 33D show various lateral aberrations that occurred in the lens arrangement shown in FIG. 31;

FIG. 34 shows a lens arrangement of the sixth numerical embodiment of the high zoom-ratio zoom lens system, according to the present invention, when an object at infinity is in an in-focus state at the short focal length extremity;

FIGS. 35A, 35B, 35C and 35D show various aberrations that occurred in the lens arrangement shown in FIG. 34;

FIGS. 36A, 36B, 36C and 36D show various lateral aberrations that occurred in the lens arrangement shown in FIG. 34;

FIGS. 38A, 38B, 38C and 38D show various aberrations that occurred in the lens arrangement shown in FIG. 37;

FIGS. 39A, 39B, 39C and 39D show various lateral aberrations that occurred in the lens arrangement shown in FIG. 37;

FIGS. 41A, 41B, 41C and 41D show various aberrations that occurred in the lens arrangement shown in FIG. 40;

FIGS. 42A, 42B, 42C and 42D show various lateral aberrations that occurred in the lens arrangement shown in FIG. 40.

DESCRIPTION OF THE EMBODIMENTS

Figure 43:
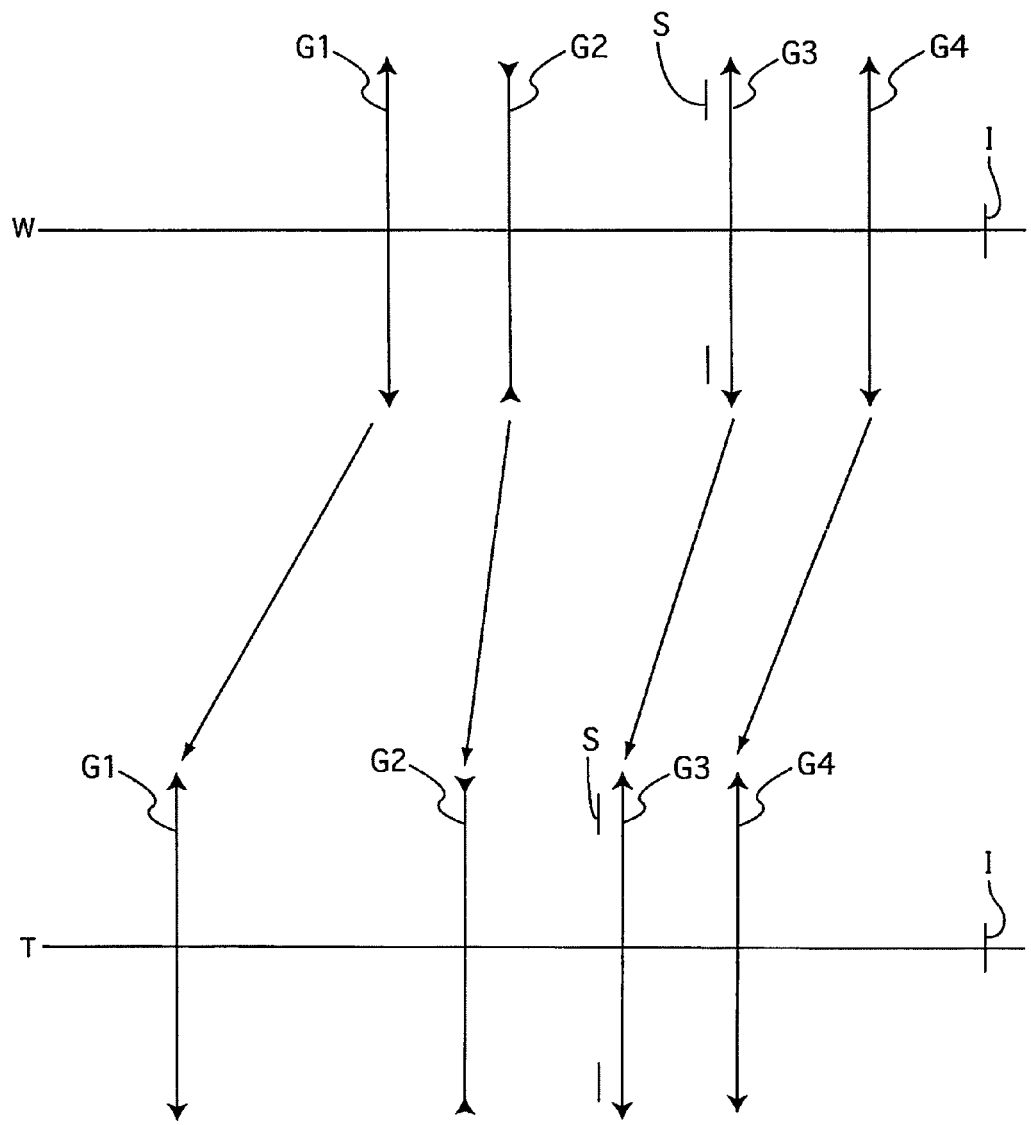
FIG. 43 shows lens-group moving paths of the high zoom-ratio zoom lens system according to the present invention.

The high zoom-ratio zoom lens system according to the present invention, as shown in the lens-group moving paths of FIG. 43, is configured of a positive first lens group G1, a negative second lens group G2, a positive third lens group G3 and a positive fourth lens group G4, in that order from the object. A diaphragm S is provided between the second lens group G2 and the third lens group G3 and moves together with the third lens group G3 during zooming. 'I' designates an imaging plane. The second lens group G2 constitutes a focusing lens group which is moved (along the optical axis direction) during a focusing operation (i.e., performing a focusing operation on an object at a closer distance from infinity by advancing the second lens group).

Upon zooming from the short focal length extremity (W) to the long focal length extremity (T), the distance between the first lens group G1 and the second lens group G2 increases, the distance between the second lens group G2 and the third lens group G3 decreases, and each of the first through fourth lens groups G1 through G4 move monotonically toward the object. Note that the distance between the third lens group G3 and the fourth lens group G4 can either increase or decrease during zooming. Furthermore, the traveling distance (toward the object) of the first lens group G1 is not only longer than that of the second lens group G2, but also longer than even those of the third lens group G3 and the fourth lens group G4.

In each of the first through seventh numerical embodiments, the first lens group G1 is configured of a cemented lens C1 which includes a negative meniscus lens element having the convex surface facing toward the object, and a biconvex positive lens element 12, and a positive meniscus lens element 13 having the convex surface facing toward the object, in that order from the object.

In each of the first through seventh numerical embodiments, the second lens group G2 is configured of a negative meniscus lens element 21 having the convex surface facing toward the object, a biconcave negative lens element 22, a biconvex positive lens element 23, and a negative meniscus lens element 24 having the convex surface facing toward the image, in that order from the object: A compound resin aspherical layer is formed and bonded onto the object-side surface of the negative meniscus lens element 21.

In the first through fourth, sixth and seventh numerical embodiments, the third lens group G3 is configured of a biconvex positive lens element 31, a biconvex positive lens element 32 and a biconcave negative lens element 33, in that order from the object.

In the fifth numerical embodiment, the third lens group G3 is configured of a biconvex positive lens element 31', and a cemented lens C3 that is formed from a biconvex positive lens element 32' and a negative meniscus lens element 33' having the convex surface facing toward the image, in that order from the object.

The fourth lens group G4 is configured of a biconvex positive lens element 41, and a cemented lens C4 formed from a negative lens element 42 and a biconvex positive lens element 43, in that order from the object. The biconvex positive lens element 43 is provided with an aspherical surface on the lens side thereof. The negative lens element 42 is a biconcave negative lens element in the first through fourth, sixth and seventh numerical embodiments, and is a negative meniscus lens element having the convex surface facing toward the object in the fifth numerical embodiment.

The illustrated embodiments of the present invention employ an internal focusing lens system, in which the second lens group G2 is moved toward the object to carry out a focusing operation on an object at a closer distance from infinity. Due to the second lens group G2 being a focusing lens group, it is unnecessary to move a large lens group like the first lens group G1 in order to carry out an autofocusing operation. Consequently, the burden on the driving system when autofocusing is performed is reduced, so that a rapid focusing operation can be attained. Furthermore, little loss in peripheral illumination occurs during close-up photography, and the diameter of the first lens group G1 (frontmost lens group) can be maintained relatively smaller; hence, such an internal focusing lens system has many practical advantages, including being advantageous for achieving further miniaturization (compactness), etc.

Condition (1) specifies the ratio of the focal length of the third lens group G3 to the focal length of the fourth lens group G4, and is for achieving further miniaturization of the zoom lens system at the short focal length extremity while maintaining superior optical quality.

If the upper limit of condition (1) is exceeded, the refractive power of the fourth lens group G4 becomes strong, and a large amount of peripheral coma occurs at the short focal length extremity, so that correcting of coma becomes difficult.

If the lower limit of condition (1) is exceeded, the refractive power of the third lens group G3 becomes strong, and it becomes difficult to correct spherical aberration. Furthermore, due to the refractive power of the third lens group G3 becoming strong, although this is advantageous with respect to further miniaturization of the zoom lens system, it becomes difficult to ensure a sufficient back focal distance. If the refractive power of the second lens group G2 is strengthened in order to secure a longer back focal distance, a large amount of distortion undesirably occurs at the short focal length extremity.

In a high zoom-ratio zoom lens system, generally, spherical aberration easily occurs, especially at the long focal length extremity. Furthermore, as a result of the correcting of aberrations by calculations (i.e., computer simulation), quite a high optical performance could be obtained; however, the high optical performance deteriorates by even a slight assembly error. Accordingly, an increase in susceptibility (due to the result of calculations based on computer simulation) to assembly error is necessary to be avoided.

Condition (2) specifies the ratio of the combined focal length of the first, second and third lens groups G1, G2 and G3 (combined lens group), to the focal length of the fourth lens group G4 when an object at infinity is in an in-focus state at the long focal length extremity. Condition (2) is for achieving a high zoom-ratio zoom lens system by which the correcting of aberrations can favourably be performed, especially at the long focal length extremity, while preventing an increase in susceptibility to assembly error. By satisfying condition (2), the axial light rays that are incident onto the fourth lens group G4 are substantially in an afocal state and an increase in susceptibility to assembly error in the fourth lens group G4 can be prevented; furthermore, spherical aberration especially at the long focal length extremity can be favourably and easily corrected.

If the upper limit of condition (2) is exceeded, since the negative refractive power of the combined lens group composed of the first, second and third lens groups G1, G2 and G3 becomes strong, the axial light rays are greatly diverged upon entering (being incident onto) the fourth lens group G4. It is necessary to increase the refractive power of the fourth lens group G4 in order to miniaturize the zoom lens system; however, if a diverged light bundle is made incident onto the fourth lens group G4, the correcting of spherical aberration becomes difficult, and further, the susceptibility to assembly error undesirably increases.

If the lower limit of condition (2) is exceeded, since the negative refractive power of the combined lens group composed of the first, second and third lens groups G1, G2 and G3 becomes weak, a state closer to an afocal state is achieved; however, a large amount of off-axial coma undesirably occurs.

As shown in each of the first through seventh numerical embodiments, the second lens group G2 constitutes a focusing lens group whose move along the optical axis causes a focusing operation.

In a lens arrangement in which the second lens group G2 constitutes the focusing lens group, condition (3) specifies the ratio of the radius of curvature of the image-side surface of the most image-side lens element in the first lens group G1 to the distance between the first lens group G1 and the second lens group G2 when an object at infinity is in an in-focus state at the short focal length extremity. Condition (3) achieves both further miniaturization of the first lens group G1 and the correcting of aberrations at the short focal length extremity.

If the upper limit of condition (3) is exceeded, the radius of curvature of the image-side surface of the most image-side lens element in the first lens group G1 becomes larger relative to the distance between the first lens group G1 and the second lens group G2, off-axis coma at the short focal length extremity is undercorrected.

If the radius of curvature of the image-side surface of the most image-side lens element in the first lens group G1 decreases to the extent that the lower limit of condition (3) is exceeded, the radius of curvature of the image-side surface of the most image-side lens element in the first lens group G1 becomes smaller. Consequently, it is advantageous for the correcting of astigmatism in both the first lens group G1 and the second lens group G2; however, the correcting of field curvature is difficult. Moreover, the diameter of the frontmost lens (first lens group G1) is increased, which are disadvantageous for miniaturization of the zoom lens system.

In order to miniaturize the fourth lens group G4, it is desirable for the fourth lens group G4 to be configured of a minimum number of lens elements that are necessary for correcting aberrations; and in order to maintain a favourable optical quality, it is desirable for the fourth lens group G4 to be configured of three lens elements, i.e., a positive lens element, a negative lens element, and a positive lens element, in that order from the object. Conventionally, two positive lens elements are provided in the object-side in the fourth lens group G4 in order to disperse the susceptibility to assembly error (i.e., configuring the fourth lens group of a positive lens element, a positive lens element, a negative lens element, and a positive lens element, in that order from the object); however, the size of the fourth lens group is enlarged (in the optical axis direction) due to such an increase in the number of lens elements.

The negative lens element and the image-side positive lens element in the fourth lens group G4 are preferably bonded together to form a cemented lens. Accordingly, the sensitivity does not become too high at the image-side surface of the negative lens element and at the object-side surface of the image-side positive lens element in the fourth lens group G4, and hence, such a major contributing factor to increasing the susceptibility to assembly error can be reduced.

It is desirable for the image-side positive lens element in the fourth lens group G4 to have an aspherical surface formed on the image side thereof. Accordingly, higher-order spherical aberration and off-axial coma can be favourably corrected, and these major contributing factors to increasing the susceptibility to assembly error that could occur within the fourth lens group G4 can be reduced.

Condition (4) specifies the ratio of the focal length of the object-side positive lens element in the fourth lens group G4 to the focal length of the entire zoom lens system at the long focal length extremity, in an arrangement in which the fourth lens group G4 is configured of three lens elements, i.e., a positive lens element, and a cemented lens formed from a negative lens element and a positive lens element, in that order from the object. By satisfying condition (4), the susceptibility to assembly error can be suppressed while favourably correcting aberrations such as spherical aberration, even if only one positive lens element is provided on the object side in the fourth lens group G4.

If the upper limit of condition (4) is exceeded, spherical aberration becomes over-corrected, and field curvature in the positive-direction undesirably increases. The term "positive direction" refers to the positive direction of the paraxial-imaging plane (the direction toward the backside of camera body). Furthermore, the overall length of the zoom lens system at the long focal length extremity undesirably increases.

If the lower limit of condition (4) is exceeded, the refractive power of the object-side positive lens element in the fourth lens group G4 increases, so that spherical aberration and off-axial coma undesirably occur. Furthermore, deterioration in optical quality occurs due to an increase in susceptibility to assembly error of the object-side positive lens element in the fourth lens group G4.

Condition (5) specifies the lateral magnification of the second lens group G2 when an object at infinity is in an in-focus state at the long focal length extremity.

If the upper limit of condition (5) is exceeded, since the angle of the axial light rays that are incident on the third lens group G3 from the second lens group G2 increases, spherical aberration that occurs in the third lens group G3 increases, so that the correcting thereof becomes difficult.

If the lower limit of condition (5) is exceeded, the travelling distance of the second lens group G2 increases during a focusing operation, so that aberration fluctuations that occur at the long focal length extremity during a focusing operation increase, which is undesirable.

EMBODIMENTS

Specific numerical embodiments will be herein discussed. The following numerical embodiments are applied to a zoom lens system used in a digital SLR camera.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

In the diagrams of lateral aberration, the solid line and the dotted line respectively indicate spherical aberrations with respect to the d and g lines.

S designates the sagittal image, M designates the meridional image, Fno. designates the f-number, f designates the focal length of the entire optical system, W designates the half angle of view (°), Y designates the image height, fB designates the back focal distance, L designates the overall length of the lens system, r designates the radius of curvature, d designates the lens thickness or distance between lenses, Nd designates the refractive index at the d-line, and vd designates the Abbe number at the d-line. With respect to an aspherical coefficient, "E-a" designates "×$10^{-a}$". The values for the f-number, the focal length, the half angle-of-view, the image height, the back focal distance, the overall length of the lens system, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein

'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Embodiment 1

Figure 1:
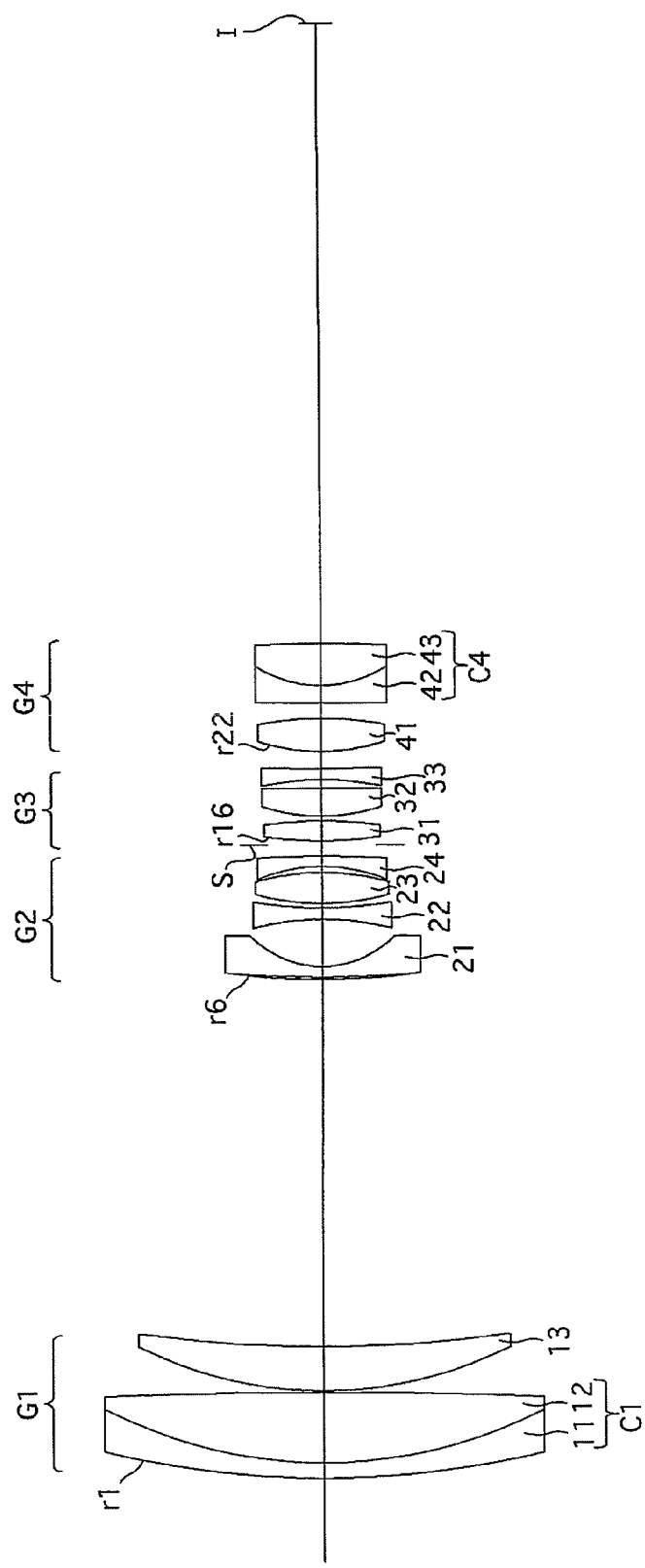
FIG. 1 shows a lens arrangement of a first numerical embodiment of a high zoom-ratio zoom lens system, according to the present invention, when an object at infinity is in an in-focus state at the long focal length extremity.
Figure 4:
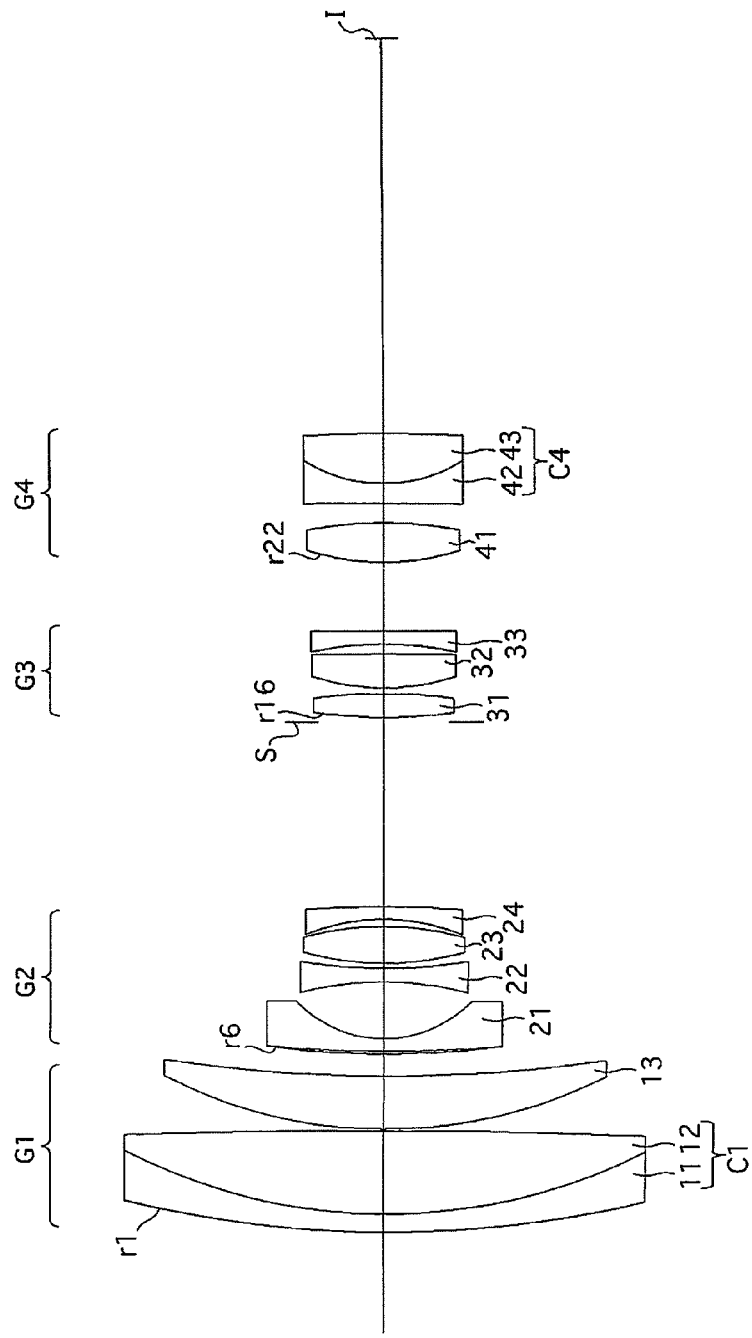
FIG. 4 shows a lens arrangement of the first numerical embodiment of the high zoom-ratio zoom lens system, according to the present invention, when an object at infinity is in an in-focus state at the short focal length extremity.

FIGS. 1 through 6D and Tables 1 through 4 show a first numerical embodiment of a high zoom-ratio zoom lens system according to the present invention. FIG. 1 shows a lens arrangement of the first numerical embodiment of the high zoom-ratio zoom lens system when an object at infinity is in an in-focus state at the long focal length extremity. FIGS. 2A, 2B, 2C and 2D show various aberrations that occurred in the lens arrangement shown in FIG. 1. FIGS. 3A, 3B, 3C and 3D show various lateral aberrations that occurred in the lens arrangement shown in FIG. 1. FIG. 4 shows a lens arrangement of the first numerical embodiment of the high zoom-ratio zoom lens system, according to the present invention, when an object at infinity is in an in-focus state at the short focal length extremity. FIGS. 5A, 5B, 5C and 5D show various aberrations that occurred in the lens arrangement shown in FIG. 4. FIGS. 6A, 6B, 6C and 6D show various lateral aberrations that occurred in the lens arrangement shown in FIG. 4. Table 1 shows the lens surface data, Table 2 shows various zoom lens system data, Table 3 shows the aspherical surface data, and Table 4 shows the lens group data of the zoom lens system according to first numerical embodiment.

The high zoom-ratio zoom lens system of the first numerical embodiment is configured of a positive first lens group G1, a negative second lens group G2, a positive third lens group G3, and a positive fourth lens group G4, in that order from the object. The second lens group G2 constitutes a focusing lens group that is moved along the optical axis direction for causing a focusing operation. More specifically, focusing is performed on an object at a closer distance from infinity by advancing the second lens group toward the object.

The first lens group G1 (surface Nos. 1 through 5) is configured of a cemented lens C1 formed from a negative meniscus lens element 11 having the convex surface facing toward the object and a positive biconvex lens element 12, and a positive meniscus lens element 13 having the convex surface facing toward the object, in that order from the object.

The second lens group G2 (surface Nos. 6 through 14) is configured of a negative meniscus lens element 21 having the convex surface facing toward the object, a biconcave negative lens element 22, a biconvex positive lens element 23, and a negative meniscus lens element 24 having the convex surface facing toward the image, in that order from the object. The object-side surface of the negative meniscus lens element 21 has an aspherical layer that is made of a compound resin bonded thereto.

The third lens group G3 (surface Nos. 16 through 21) is configured of a biconvex positive lens element 31, a biconvex positive lens element 32, and a biconcave negative lens element 33, in that order from the object. A diaphragm S (surface No. 15) is provided between the second lens group G2 and the third lens group G3 and moves integrally with the third lens group G3.

The fourth lens group G4 (surface Nos. 22 through 26) is configured of a biconvex positive lens element 41, and a cemented lens C4 formed from a biconcave negative lens element 42 and a biconvex positive lens element 43, in that order from the object. The biconvex positive lens element 43 is provided with an aspherical surface on the image side thereof.

TABLE 1

| SURFACE DATA | | | | |
|---|---|---|---|---|
| Surf. No. | r | d | Nd | vd |
| 1 | 110.234 | 1.800 | 1.80518 | 25.5 |
| 2 | 56.449 | 8.305 | 1.48749 | 70.4 |
| 3 | −720.370 | 0.150 | | |
| 4 | 48.733 | 5.258 | 1.69680 | 55.5 |
| 5 | 155.193 | d5 | | |
| 6* | 156.101 | 0.200 | 1.52972 | 42.7 |
| 7 | 129.644 | 1.250 | 1.83481 | 42.7 |
| 8 | 12.172 | 5.585 | | |
| 9 | −33.583 | 1.340 | 1.83481 | 42.7 |
| 10 | 49.000 | 0.515 | | |
| 11 | 29.705 | 3.641 | 1.84666 | 23.8 |
| 12 | −29.705 | 0.712 | | |
| 13 | −20.403 | 1.250 | 1.77250 | 49.6 |
| 14 | −115.732 | d14 | | |
| 15(Diaphragm) | ∞ | 0.500 | | |
| 16 | 51.303 | 2.349 | 1.48749 | 70.4 |
| 17 | −51.303 | 0.566 | | |
| 18 | 23.522 | 3.301 | 1.48749 | 70.4 |
| 19 | −653.902 | 0.980 | | |
| 20 | −34.497 | 1.300 | 1.70154 | 41.2 |
| 21 | 860.468 | d21 | | |
| 22 | 25.162 | 3.881 | 1.49700 | 81.6 |
| 23 | −40.887 | 1.858 | | |
| 24 | −2060.077 | 2.014 | 1.80450 | 39.6 |
| 25 | 14.881 | 5.000 | 1.58636 | 60.9 |

TABLE 1-continued

SURFACE DATA

| Surf. No. | r | d | Nd | vd |
|---|---|---|---|---|
| 26 * | −78.231 | — | | |

The asterisk (*) designates an aspherical surface which is rotationally symmetrical with respect to the optical axis.

TABLE 2

ZOOM LENS SYSTEM DATA
Zoom Ratio 7.06

| | Short-FLE | IFL | Long-FLE |
|---|---|---|---|
| FNO. | 3.60 | 5.19 | 5.79 |
| f | 18.60 | 69.90 | 131.23 |
| W | 38.41 | 11.21 | 6.06 |
| Y | 14.24 | 14.24 | 14.24 |
| fB | 38.867 | 63.22 | 72.385 |
| L | 117.89 | 155.31 | 170.65 |
| d5 | 2.232 | 32.046 | 43.221 |
| d14 | 18.246 | 5.844 | 1.290 |
| d21 | 6.787 | 2.443 | 2.000 |

Note:
Short-FLE designates Short Focal Length Extremity;
IFL designates Intermediate Focal Length;
Long-FLE designates Long Focal Length Extremity; and
S. No. designates a surface number

TABLE 3

Aspherical Surface Data (the aspherical surface coefficients not indicated are zero (0.00)):

| S. No. | K | A4 | A6 | A8 |
|---|---|---|---|---|
| 6 | 0.000 | 0.2513E−04 | −0.9914E−07 | 0.4454E−09 |
| | | A10 | | |
| | | −0.9618E−12 | | |

| S. No. | K | A4 | A6 | A8 |
|---|---|---|---|---|
| 26 | 0.000 | 0.3671E−04 | 0.3789E−07 | 0.7307E−09 |

TABLE 4

LENS GROUP DATA

| Lens Group | 1st Surf. | Focal Length |
|---|---|---|
| 1 | 1 | 81.627 |
| 2 | 6 | −12.103 |
| 3 | 16 | 45.917 |
| 4 | 22 | 41.035 |

Embodiment 2

Figure 10:
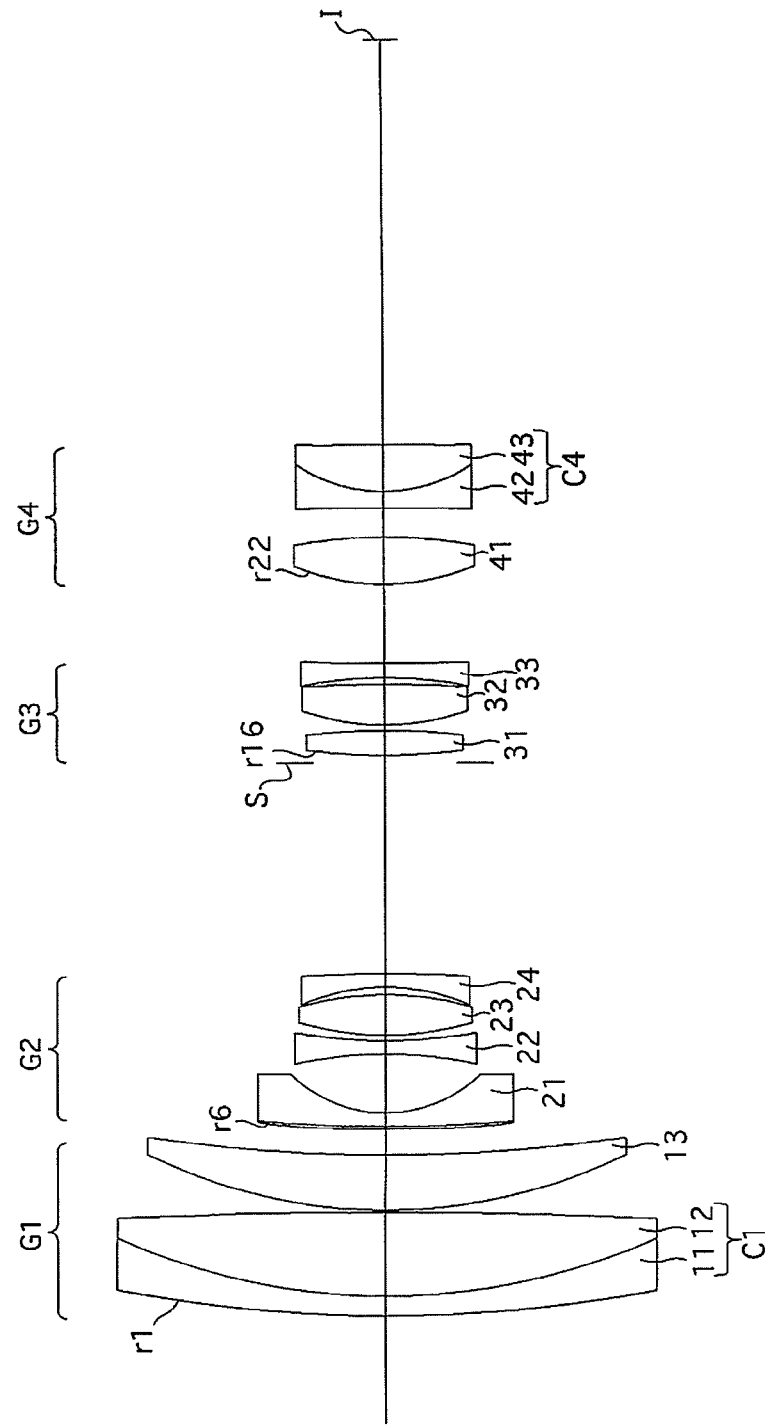
FIG. 10 shows a lens arrangement of the second numerical embodiment of the high zoom-ratio zoom lens system, according to the present invention, when an object at infinity is in an in-focus state at the short focal length extremity.

FIGS. 7 through 12D and Tables 5 through 8 show a second numerical embodiment of a high zoom-ratio zoom lens system according to the present invention. FIG. 7 shows a lens arrangement of the second numerical embodiment of the high zoom-ratio zoom lens system when an object at infinity is in an in-focus state at the long focal length extremity. FIGS. 8A, 8B, 8C and 8D show various aberrations that occurred in the lens arrangement shown in FIG. 7. FIGS. 9A, 9B, 9C and 9D show various lateral aberrations that occurred in the lens arrangement shown in FIG. 7. FIG. 10 shows a lens arrangement of the second numerical embodiment of the high zoom-ratio zoom lens system, according to the present invention, when an object at infinity is in an in-focus state at the short focal length extremity. FIGS. 11A, 11B, 11C and 11D show various aberrations that occurred in the lens arrangement shown in FIG. 10. FIGS. 12A, 12B, 12C and 12D show various lateral aberrations that occurred in the lens arrangement shown in FIG. 10. Table 5 shows the lens surface data, Table 6 shows various zoom lens system data, Table 7 shows the aspherical surface data, and Table 8 shows the lens group data of the zoom lens system according to second numerical embodiment.

The fundamental lens arrangement of the second numerical embodiment is the same as that of the first numerical embodiment.

TABLE 5

SURFACE DATA

| Surf. No. | r | d | N(d) | vd |
|---|---|---|---|---|
| 1 | 132.353 | 1.800 | 1.84666 | 23.8 |
| 2 | 59.717 | 7.769 | 1.51680 | 64.2 |
| 3 | −508.034 | 0.150 | | |
| 4 | 50.408 | 5.051 | 1.77250 | 49.6 |
| 5 | 153.947 | d5 | | |
| 6 * | 445.617 | 0.200 | 1.52972 | 42.7 |
| 7 | 137.322 | 1.250 | 1.83481 | 42.7 |
| 8 | 12.602 | 5.403 | | |
| 9 | −37.692 | 1.220 | 1.83481 | 42.7 |
| 10 | 49.000 | 0.500 | | |
| 11 | 29.241 | 3.678 | 1.84666 | 23.8 |
| 12 | −29.241 | 0.726 | | |
| 13 | −19.166 | 1.250 | 1.77250 | 49.6 |
| 14 | −113.209 | d14 | | |
| 15(Diaphragm) | ∞ | 0.700 | | |
| 16 | 57.543 | 2.279 | 1.48749 | 70.4 |
| 17 | −57.543 | 0.500 | | |
| 18 | 23.413 | 3.731 | 1.48749 | 70.4 |
| 19 | −118.753 | 0.598 | | |
| 20 | −38.149 | 1.300 | 1.70154 | 41.2 |
| 21 | 293.464 | d21 | | |
| 22 | 21.643 | 4.310 | 1.49700 | 81.6 |
| 23 | −46.908 | 2.672 | | |
| 24 | −289.027 | 1.500 | 1.80450 | 39.6 |
| 25 | 14.753 | 4.298 | 1.58913 | 61.2 |
| 26 * | −130.439 | — | | |

The asterisk (*) designates an aspherical surface which is rotationally symmetrical with respect to the optical axis.

TABLE 6

ZOOM LENS SYSTEM DATA
Zoom Ratio 7.05

| | Short-FLE | IFL | Long-FLE |
|---|---|---|---|
| FNO. | 3.60 | 5.19 | 5.77 |
| f | 18.61 | 70.04 | 131.27 |
| W | 38.44 | 11.16 | 6.04 |
| Y | 14.24 | 14.24 | 14.24 |
| fB | 36.832 | 60.738 | 69.328 |
| L | 116.65 | 153.02 | 167.64 |
| d5 | 2.376 | 32.170 | 43.348 |
| d14 | 19.328 | 6.635 | 1.980 |
| d21 | 7.235 | 2.596 | 2.102 |

TABLE 7

Aspherical Surface Data (the aspherical surface coefficients not indicated are zero (0.00)):

| S. No. | K | A4 | A6 | A8 |
|---|---|---|---|---|
| 6 | 0.000 | 0.2996E−04 | −0.9705E−07 | 0.3359E−09 |
| | | A10 | | |
| | | −0.3629E−12 | | |

| S. No. | K | A4 | A6 | A8 |
|---|---|---|---|---|
| 26 | 0.000 | 0.4561E−04 | 0.1617E−06 | 0.4136E−09 |

TABLE 7-continued

Aspherical Surface Data (the aspherical surface coefficients not indicated are zero (0.00)):

TABLE 8

LENS GROUP DATA

| Lens Group | 1st Surf. | Focal Length |
|---|---|---|
| 1 | 1 | 80.973 |
| 2 | 6 | −12.285 |
| 3 | 16 | 43.478 |
| 4 | 22 | 45.449 |

Embodiment 3

Figure 13:
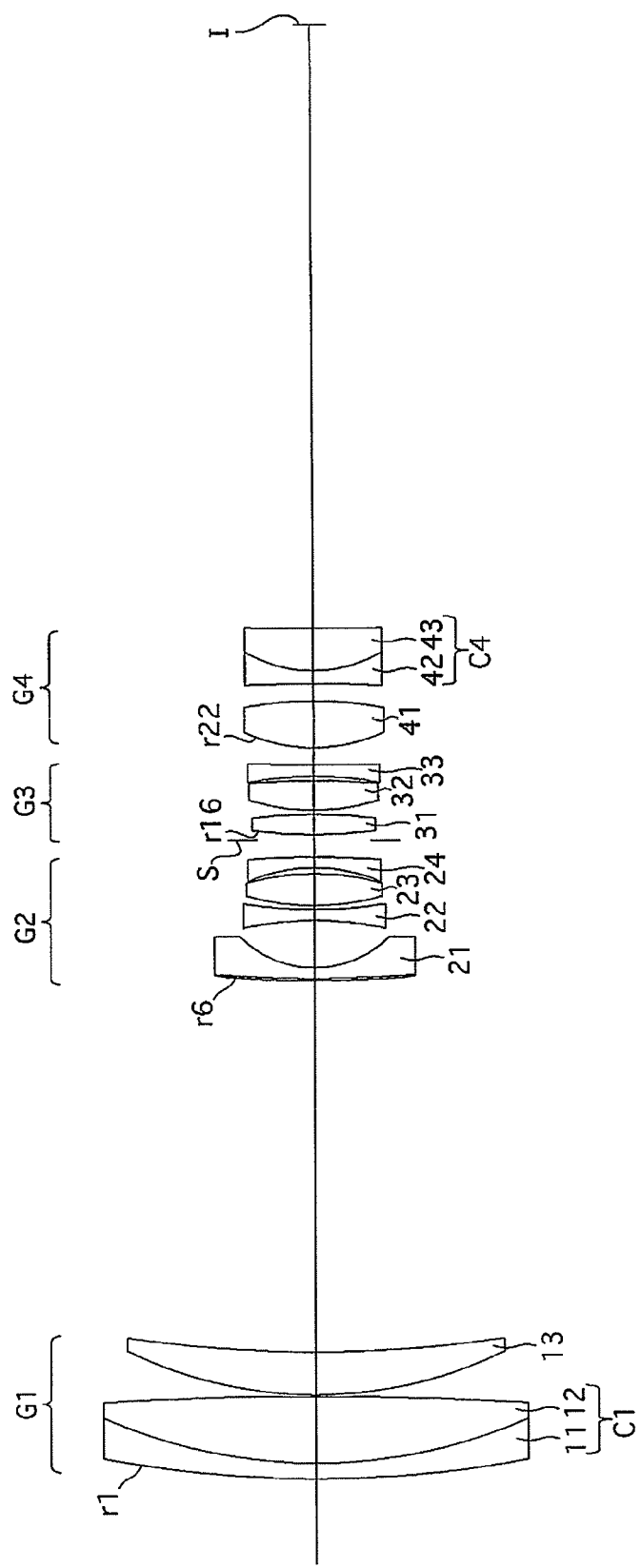
FIG. 13 shows a lens arrangement of a third numerical embodiment of the high zoom-ratio zoom lens system, according to the present invention, when an object at infinity is in an in-focus state at the long focal length extremity.

FIGS. 13 through 18D and Tables 9 through 12 show a third numerical embodiment of a high zoom-ratio zoom lens system according to the present invention. FIG. 13 shows a lens arrangement of the third numerical embodiment of the high zoom-ratio zoom lens system when an object at infinity is in an in-focus state at the long focal length extremity. FIGS. 14A, 14B, 14C and 14D show various aberrations that occurred in the lens arrangement shown in FIG. 13. FIGS. 15A, 15B, 15C and 15D show various lateral aberrations that occurred in the lens arrangement shown in FIG. 13. FIG. 16 shows a lens arrangement of the third numerical embodiment of the high zoom-ratio zoom lens system, according to the present invention when an object at infinity is in an in-focus state at the short focal length extremity. FIGS. 17A, 17B, 17C and 17D show various aberrations that occurred in the lens arrangement shown in FIG. 16. FIGS. 18A, 18B, 18C and 18D show various lateral aberrations that occurred in the lens arrangement shown in FIG. 16. Table 9 shows the lens surface data, Table 10 shows various zoom lens system data, Table 11 shows the aspherical surface data, and Table 12 shows the lens group data of the zoom lens system according to third numerical embodiment.

The fundamental lens arrangement of the third numerical embodiment is the same as that of the first numerical embodiment.

TABLE 9

SURFACE DATA

| Surf. No | r | d | N(d) | vd |
|---|---|---|---|---|
| 1 | 135.134 | 1.800 | 1.84666 | 23.8 |
| 2 | 60.679 | 7.825 | 1.51680 | 64.2 |
| 3 | −424.986 | 0.173 | | |
| 4 | 49.779 | 5.037 | 1.77250 | 49.6 |
| 5 | 145.810 | d5 | | |
| 6 * | 731.924 | 0.200 | 1.52972 | 42.7 |
| 7 | 154.345 | 1.250 | 1.83481 | 42.7 |
| 8 | 12.411 | 5.501 | | |
| 9 | −37.960 | 1.226 | 1.83481 | 42.7 |
| 10 | 49.000 | 0.500 | | |
| 11 | 29.300 | 3.681 | 1.84666 | 23.8 |
| 12 | −29.300 | 0.692 | | |
| 13 | −19.578 | 1.250 | 1.77250 | 49.6 |
| 14 | −114.254 | d14 | | |
| 15(Diaphragm) | ∞ | 0.700 | | |
| 16 | 57.277 | 2.290 | 1.48749 | 70.4 |
| 17 | −57.277 | 0.500 | | |
| 18 | 25.498 | 3.367 | 1.48749 | 70.4 |
| 19 | −104.456 | 0.549 | | |

TABLE 9-continued

SURFACE DATA

| Surf. No | r | d | N(d) | vd |
|---|---|---|---|---|
| 20 | −39.128 | 1.300 | 1.70154 | 41.2 |
| 21 | 258.781 | d21 | | |
| 22 | 19.875 | 5.396 | 1.49700 | 81.6 |
| 23 | −43.551 | 2.009 | | |
| 24 | −143.308 | 1.500 | 1.80440 | 39.6 |
| 25 | 15.843 | 5.000 | 1.58913 | 61.2 |
| 26 * | −139.484 | — | | |

The asterisk (*) designates an aspherical surface which is rotationally symmetrical with respect to the optical axis.

TABLE 10

ZOOM LENS SYSTEM DATA
Zoom Ratio 7.06

| | Short-FLE | IFL | Long-FLE |
|---|---|---|---|
| FNO. | 3.60 | 5.16 | 5.78 |
| f | 18.60 | 70.11 | 131.33 |
| W | 38.46 | 11.14 | 6.03 |
| Y | 14.24 | 14.24 | 14.24 |
| fB | 37.372 | 60.51 | 69.715 |
| L | 117.94 | 153.92 | 168.61 |
| d5 | 2.372 | 32.527 | 43.211 |
| d14 | 19.000 | 6.648 | 1.940 |
| d21 | 7.454 | 2.491 | 2.000 |

TABLE 11

Aspherical Surface Data (the aspherical surface coefficients not indicated are zero (0.00)):

| S. No. | K | A4 | A6 | A8 |
|---|---|---|---|---|
| 6 | 0.000 | 0.3139E−04 | −0.1027E−06 | 0.3042E−09 |
| | | A10 | | |
| | | −0.3046E−12 | | |
| S. No. | K | A4 | A6 | A8 |
| 26 | 0.000 | 0.5093E−04 | 0.1846E−06 | 0.5705E−09 |

TABLE 12

LENS GROUP DATA

| Lens Group | 1st Surf. | Focal Length |
|---|---|---|
| 1 | 1 | 80.407 |
| 2 | 6 | −12.186 |
| 3 | 16 | 45.918 |
| 4 | 22 | 43.850 |

Embodiment 4

Figure 22:
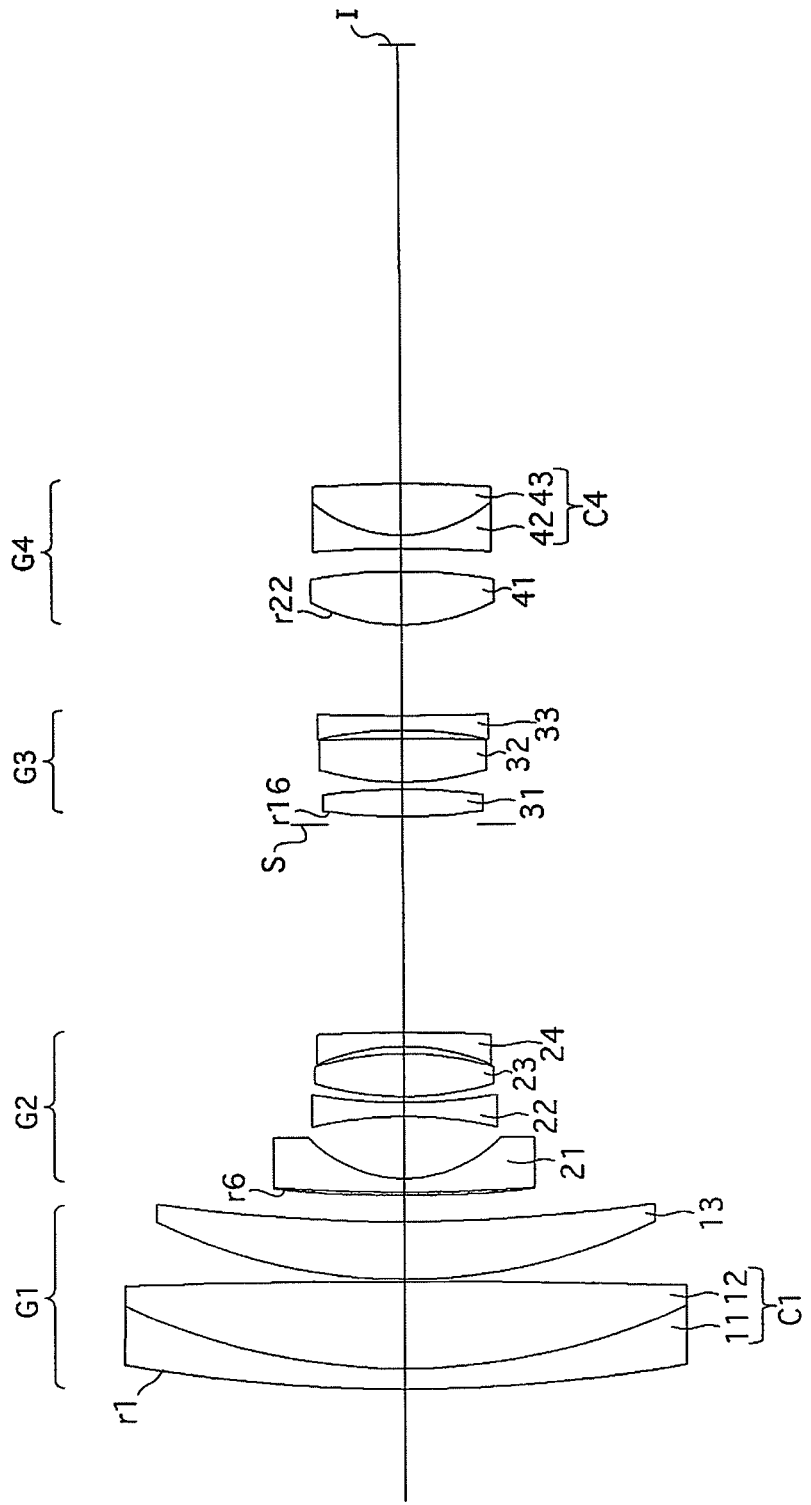
FIG. 22 shows a lens arrangement of the fourth numerical embodiment of the high zoom-ratio zoom lens system, according to the present invention, when an object at infinity is in an in-focus state at the short focal length extremity.

FIGS. 19 through 24D and Tables 13 through 16 show a fourth numerical embodiment of a high zoom-ratio zoom lens system according to the present invention. FIG. 19 shows a lens arrangement of the fourth numerical embodiment of the high zoom-ratio zoom lens system when an object at infinity is in an in-focus state at the long focal length extremity. FIGS. 20A, 20B, 20C and 20D show various aberrations that occurred in the lens arrangement shown in FIG. 19. FIGS. 21A, 21B, 21C and 21D show various lateral aberrations that occurred in the lens arrangement shown in FIG. 19. FIG. 22 shows a lens arrangement of the fourth numerical embodiment of the high zoom-ratio zoom lens system, according to the present invention when an object at infinity is in an in-focus state at the short focal length extremity. FIGS. 23A, 23B, 23C and 23D show various aberrations that occurred in the lens arrangement shown in FIG. 22. FIGS. 24A, 24B, 24C and 24D show various lateral aberrations that occurred in the lens arrangement shown in FIG. 22. Table 13 shows the lens surface data, Table 14 shows various zoom lens system data, Table 15 shows the aspherical surface data, and Table 16 shows the lens group data of the zoom lens system according to fourth numerical embodiment.

The fundamental lens arrangement of the fourth numerical embodiment is the same as that of the first numerical embodiment.

TABLE 13

SURFACE DATA

| Surf. No. | r | d | N(d) | vd |
|---|---|---|---|---|
| 1 | 144.000 | 1.800 | 1.84666 | 23.8 |
| 2 | 57.600 | 7.730 | 1.56384 | 60.8 |
| 3 | −800.000 | 0.150 | | |
| 4 | 50.630 | 5.060 | 1.80420 | 46.5 |
| 5 | 157.605 | d5 | | |
| 6 * | 254.957 | 0.200 | 1.52972 | 42.7 |
| 7 | 139.000 | 1.250 | 1.83481 | 42.7 |
| 8 | 12.181 | 5.430 | | |
| 9 | −37.680 | 1.220 | 1.88300 | 40.8 |
| 10 | 48.983 | 0.530 | | |
| 11 | 28.598 | 3.750 | 1.84666 | 23.8 |
| 12 | −28.598 | 0.650 | | |
| 13 | −19.783 | 1.250 | 1.77250 | 49.6 |
| 14 | −152.239 | d14 | | |
| 15(Diaphragm) | ∞ | 0.700 | | |
| 16 | 51.387 | 2.400 | 1.48749 | 70.4 |
| 17 | −51.387 | 0.630 | | |
| 18 | 27.000 | 3.840 | 1.48749 | 70.4 |
| 19 | −167.481 | 0.700 | | |
| 20 | −36.572 | 1.300 | 1.60562 | 43.7 |
| 21 | 330.000 | d21 | | |
| 22 | 17.929 | 4.720 | 1.45860 | 90.2 |
| 23 | −46.238 | 1.960 | | |
| 24 | −136.110 | 1.200 | 1.79952 | 42.2 |
| 25 | 12.448 | 4.560 | 1.58313 | 59.5 |
| 26 * | −64.421 | — | | |

The asterisk (*) designates an aspherical surface which is rotationally symmetrical with respect to the optical axis.

TABLE 14

ZOOM LENS SYSTEM DATA
Zoom Ratio 7.04

| | Short-FLE | IFL | Long-FLE |
|---|---|---|---|
| FNO. | 3.60 | 5.15 | 5.76 |
| f | 18.60 | 69.99 | 130.98 |
| W | 38.66 | 11.17 | 6.05 |
| Y | 14.24 | 14.24 | 14.24 |
| fB | 38.307 | 62.13 | 71.489 |
| L | 117.90 | 154.18 | 169.13 |
| d5 | 2.317 | 32.134 | 42.712 |
| d14 | 18.258 | 6.382 | 1.903 |
| d21 | 7.992 | 2.505 | 2.000 |

TABLE 15

Aspherical Surface Data (the aspherical surface coefficients not indicated are zero (0.00)):

| S. No. | K | A4 | A6 | A8 |
|---|---|---|---|---|
| 6 | 0.000 | 0.2523E−04 | −0.7489E−07 | 0.1938E−09 |
| | | A10 | | |
| | | −0.8848E−13 | | |
| S. No. | K | A4 | A6 | A8 |

TABLE 15-continued

Aspherical Surface Data (the aspherical surface coefficients not indicated are zero (0.00)):

| 26 | 0.000 | 0.4032E−04 | 0.9330E−07 | 0.7805E−09 |
|---|---|---|---|---|

TABLE 16

LENS GROUP DATA

| Lens Group | 1$^{st}$ Surf. | Focal Length |
|---|---|---|
| 1 | 1 | 79.318 |
| 2 | 6 | −11.794 |
| 3 | 16 | 42.877 |
| 4 | 22 | 44.686 |

Embodiment 5

Figure 28:
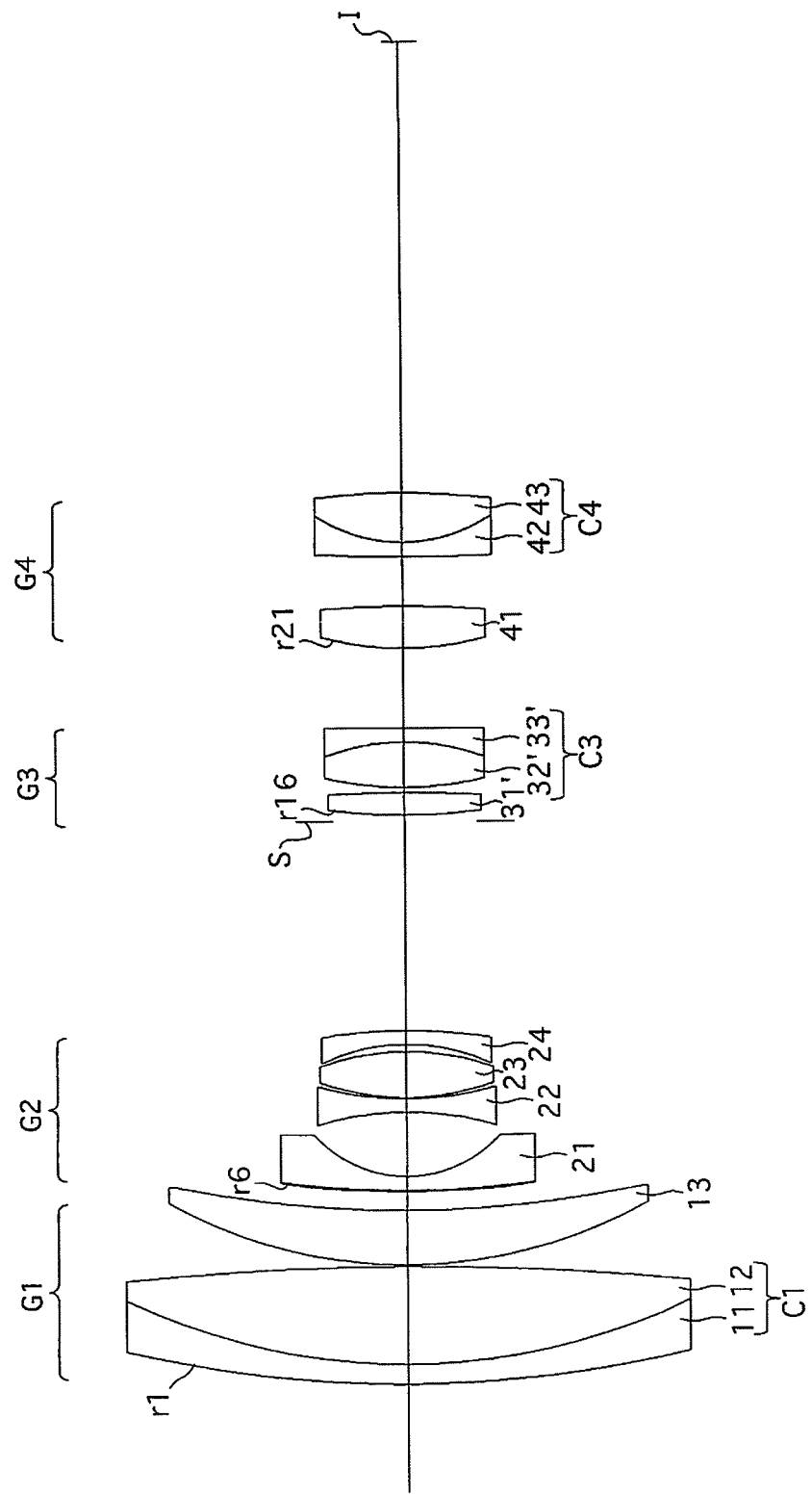
FIG. 28 shows a lens arrangement of the fifth numerical embodiment of the high zoom-ratio zoom lens system, according to the present invention, when an object at infinity is in an in-focus state at the short focal length extremity.

FIGS. 25 through 30D and Tables 17 through 20 show a fifth numerical embodiment of a high zoom-ratio zoom lens system according to the present invention. FIG. 25 shows a lens arrangement of the fifth numerical embodiment of the high zoom-ratio zoom lens system when an object at infinity is in an in-focus state at the long focal length extremity. FIGS. 26A, 26B, 26C and 26D show various aberrations that occurred in the lens arrangement shown in FIG. 25. FIGS. 27A, 27B, 27C and 27D show various lateral aberrations that occurred in the lens arrangement shown in FIG. 25. FIG. 28 shows a lens arrangement of the fifth numerical embodiment of the high zoom-ratio zoom lens system, according to the present invention when an object at infinity is in an in-focus state at the short focal length extremity. FIGS. 29A, 29B, 29C and 29D show various aberrations that occurred in the lens arrangement shown in FIG. 28. FIGS. 30A, 30B, 30C and 30D show various lateral aberrations that occurred in the lens arrangement shown in FIG. 28. Table 17 shows the lens surface data, Table 18 shows various zoom lens system data, Table 19 shows the aspherical surface data, and Table 20 shows the lens group data of the zoom lens system according to fifth numerical embodiment.

The fundamental lens arrangement of the fifth numerical embodiment is the same as that of the first numerical embodiment except for the following points:

(1) The third lens group G3 is configured of a biconvex positive lens element 31', and a cemented lens C3 which is formed from a biconvex positive lens element 32' and a negative meniscus lens element 33' having the convex surface facing toward the image, in that order from the object.

(2) The negative lens element 42 of the fourth lens group G4 is a negative meniscus lens element having the convex surface facing toward the object.

TABLE 17

SURFACE DATA

| Surf. No. | r | d | N(d) | vd |
|---|---|---|---|---|
| 1 | 112.862 | 1.800 | 1.80518 | 25.5 |
| 2 | 59.624 | 9.047 | 1.48749 | 70.4 |
| 3 | −247.174 | 0.150 | | |
| 4 | 45.827 | 4.937 | 1.62644 | 60.1 |
| 5 | 106.700 | d5 | | |
| 6 * | 139.249 | 0.100 | 1.52972 | 42.7 |
| 7 | 90.086 | 1.250 | 1.81115 | 45.6 |
| 8 | 11.669 | 5.892 | | |

TABLE 17-continued

SURFACE DATA

| Surf. No. | r | d | N(d) | vd |
|---|---|---|---|---|
| 9 | −28.920 | 1.220 | 1.78251 | 48.6 |
| 10 | 30.875 | 0.100 | | |
| 11 | 24.032 | 4.191 | 1.80518 | 25.5 |
| 12 | −24.323 | 0.692 | | |
| 13 | −18.230 | 1.250 | 1.83481 | 42.7 |
| 14 | −49.487 | d14 | | |
| 15(Diaphragm) | ∞ | 0.500 | | |
| 16 | 50.205 | 2.054 | 1.48749 | 70.4 |
| 17 | −165.189 | 0.500 | | |
| 18 | 33.003 | 4.124 | 1.49700 | 81.6 |
| 19 | −21.047 | 1.300 | 1.70092 | 41.3 |
| 20 | −3917.242 | d20 | | |
| 21 | 29.003 | 3.843 | 1.56935 | 46.7 |
| 22 | −93.324 | 4.531 | | |
| 23 | 196.599 | 1.300 | 1.83481 | 37.1 |
| 24 | 14.907 | 4.500 | 1.58636 | 60.9 |
| 25 * | −54.560 | — | | |

The asterisk (*) designates an aspherical surface which is rotationally symmetrical with respect to the optical axis.

TABLE 18

ZOOM LENS SYSTEM DATA
Zoom Ratio 7.05

| | Short-FLE | IFL | Long-FLE |
|---|---|---|---|
| FNO. | 3.60 | 5.17 | 5.75 |
| f | 18.60 | 70.06 | 131.05 |
| W | 38.31 | 11.17 | 6.07 |
| Y | 14.24 | 14.24 | 14.24 |
| fB | 41.061 | 66.507 | 75.566 |
| L | 122.52 | 161.50 | 177.12 |
| d5 | 1.730 | 33.080 | 44.978 |
| d14 | 19.195 | 5.917 | 1.290 |
| d20 | 7.251 | 2.714 | 2.000 |

TABLE 19

Aspherical Surface Data (the aspherical surface coefficients not indicated are zero (0.00)):

| S. No. | K | A4 | A6 | A8 |
|---|---|---|---|---|
| 6 | 0.000 | 0.2547E−04 | −0.1143E−06 | 0.4880E−09 |
| | | A10 | | |
| | | −0.1036E−11 | | |
| S. No. | K | A4 | A6 | A8 |
| 25 | 0.000 | 0.1857E−04 | 0.3422E−07 | 0.3102E−10 |

TABLE 20

LENS GROUP DATA

| Lens Group | 1$^{st}$ Surf. | Focal Length |
|---|---|---|
| 1 | 1 | 85.196 |
| 2 | 6 | −12.580 |
| 3 | 16 | 53.259 |
| 4 | 21 | 42.211 |

Embodiment 6

Figure 31:
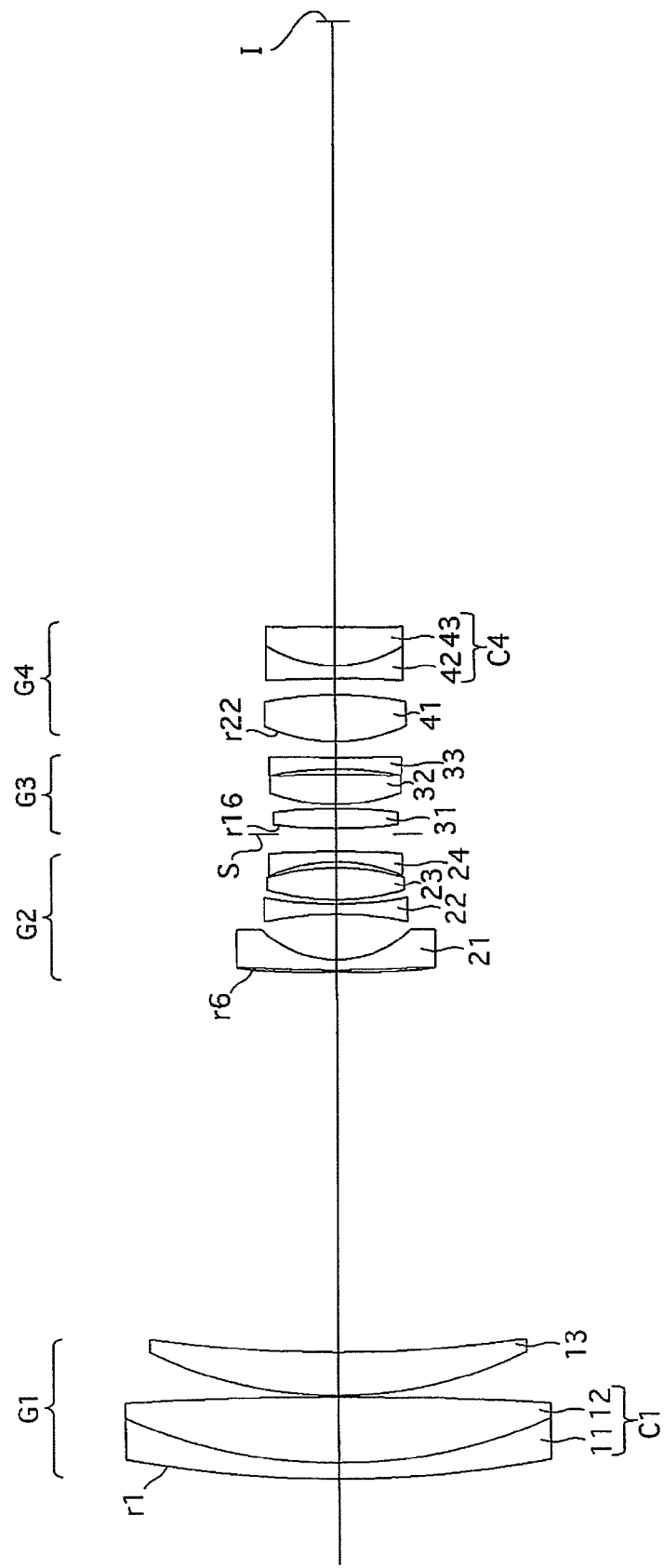
FIG. 31 shows a lens arrangement of a sixth numerical embodiment of the high zoom-ratio zoom lens system, according to the present invention, when an object at infinity is in an in-focus state at the long focal length extremity.

FIGS. 31 through 36D and Tables 21 through 24 show a sixth numerical embodiment of a high zoom-ratio zoom lens system according to the present invention. FIG. 31 shows a lens arrangement of the sixth numerical embodiment of the high zoom-ratio zoom lens system when an object at infinity is in an in-focus state at the long focal length extremity. FIGS. 32A, 32B, 32C and 32D show various aberrations that occurred in the lens arrangement shown in FIG. 31. FIGS. 33A, 33B, 33C and 33D show various lateral aberrations that occurred in the lens arrangement shown in FIG. 31. FIG. 34 shows a lens arrangement of the sixth numerical embodiment of the high zoom-ratio zoom lens system, according to the present invention when an object at infinity is in an in-focus state at the short focal length extremity. FIGS. 35A, 35B, 35C and 35D show various aberrations that occurred in the lens arrangement shown in FIG. 31. FIGS. 36A, 36B, 36C and 36D show various lateral aberrations that occurred in the lens arrangement shown in FIG. 34. Table 21 shows the lens surface data, Table 22 shows various zoom lens system data, Table 23 shows the aspherical surface data, and Table 24 shows the lens group data of the zoom lens system according to sixth numerical embodiment.

The fundamental lens arrangement of the sixth numerical embodiment is the same as that of the first numerical embodiment.

TABLE 21

SURFACE DATA

| Surf. No. | r | d | N(d) | vd |
|---|---|---|---|---|
| 1 | 139.583 | 1.800 | 1.84666 | 23.8 |
| 2 | 61.443 | 7.709 | 1.51680 | 64.2 |
| 3 | −439.811 | 0.150 | | |
| 4 | 50.391 | 5.008 | 1.77250 | 49.6 |
| 5 | 149.603 | d5 | | |
| 6 * | 5919.346 | 0.200 | 1.52972 | 42.7 |
| 7 | 187.094 | 1.250 | 1.83481 | 42.7 |
| 8 | 12.540 | 5.270 | | |
| 9 | −39.288 | 1.220 | 1.83481 | 42.7 |
| 10 | 49.013 | 0.500 | | |
| 11 | 29.258 | 3.680 | 1.84666 | 23.8 |
| 12 | −29.258 | 0.685 | | |
| 13 | −19.620 | 1.250 | 1.77250 | 49.6 |
| 14 | −111.613 | d14 | | |
| 15(Diaphragm) | ∞ | 0.700 | | |
| 16 | 57.787 | 2.282 | 1.48749 | 70.4 |
| 17 | −57.787 | 0.500 | | |
| 18 | 22.604 | 3.437 | 1.48749 | 70.4 |
| 19 | −186.802 | 0.657 | | |
| 20 | −40.215 | 1.300 | 1.70154 | 41.2 |
| 21 | 267.580 | d21 | | |
| 22 | 20.484 | 5.317 | 1.49700 | 81.6 |
| 23 | −43.744 | 1.916 | | |
| 24 | −168.751 | 1.500 | 1.80440 | 39.6 |
| 25 | 14.905 | 4.514 | 1.58913 | 61.2 |
| 26 * | −144.920 | — | | |

The asterisk (*) designates an aspherical surface which is rotationally symmetrical with respect to the optical axis.

TABLE 22

ZOOM LENS SYSTEM DATA
Zoom Ratio 7.09

| | Short-FLE | IFL | Long-FLE |
|---|---|---|---|
| FNO. | 3.60 | 5.20 | 5.81 |
| f | 18.60 | 70.08 | 131.83 |
| W | 38.35 | 11.16 | 6.01 |
| Y | 14.24 | 14.24 | 14.24 |
| fB | 36.82 | 60.709 | 69.652 |
| L | 116.95 | 153.43 | 168.45 |
| d5 | 2.500 | 32.793 | 44.107 |
| d14 | 19.392 | 6.640 | 1.946 |
| d21 | 7.397 | 2.442 | 1.900 |

TABLE 23

Aspherical Surface Data (the aspherical surface coefficients not indicated are zero (0.00)):

| S. No. | K | A4 | A6 | A8 |
|---|---|---|---|---|
| 6 | 0.000 | 0.3278E−04 | −0.8984E−07 | 0.2257E−09 |
|   |   | A10 |   |   |
|   |   | −0.1012E−12 |   |   |
| S. No. | K | A4 | A6 | A8 |
| 26 | 0.000 | 0.5045E−04 | 0.1998E−06 | 0.5180E−09 |

TABLE 24

LENS GROUP DATA

| Lens Group | 1st Surf. | Focal Length |
|---|---|---|
| 1 | 1 | 81.918 |
| 2 | 6 | −12.392 |
| 3 | 16 | 43.682 |
| 4 | 22 | 45.748 |

Embodiment 7

Figure 37:
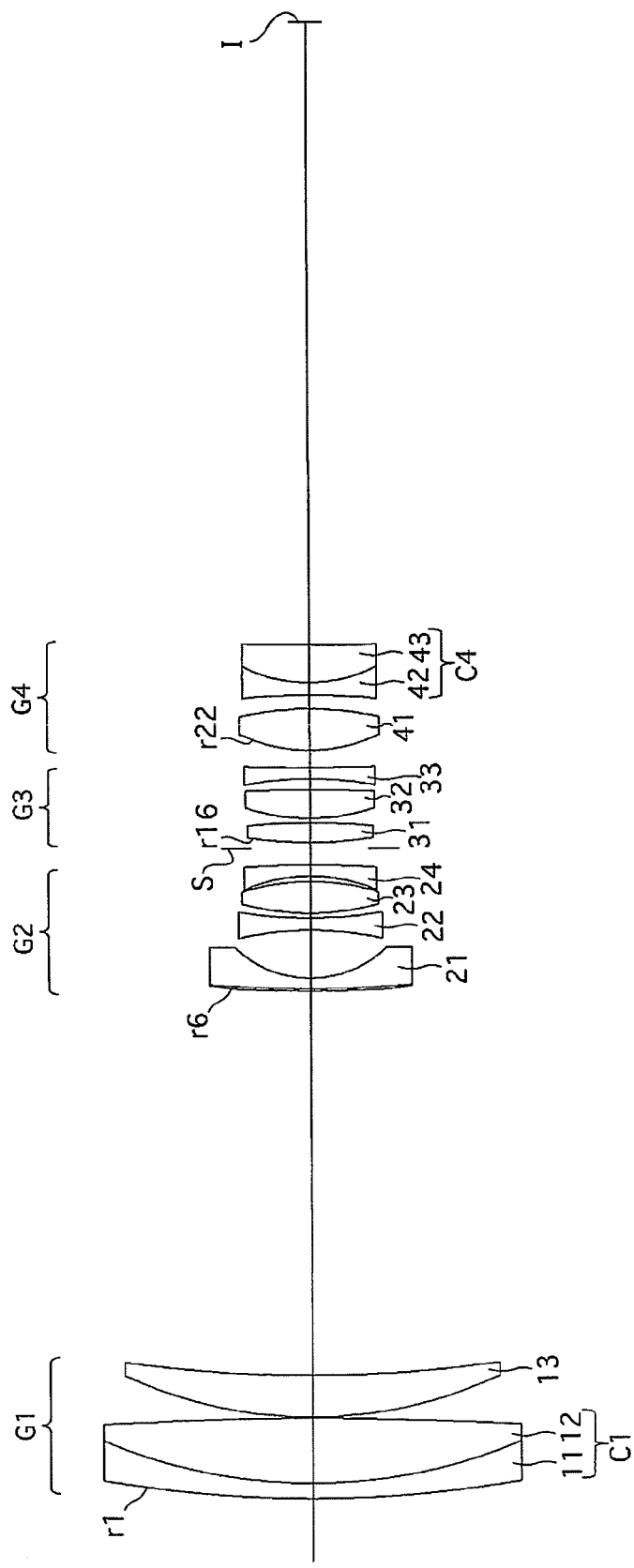
FIG. 37 shows a lens arrangement of a seventh numerical embodiment of the high zoom-ratio zoom lens system, according to the present invention, when an object at infinity is in an in-focus state at the long focal length extremity.
Figure 40:
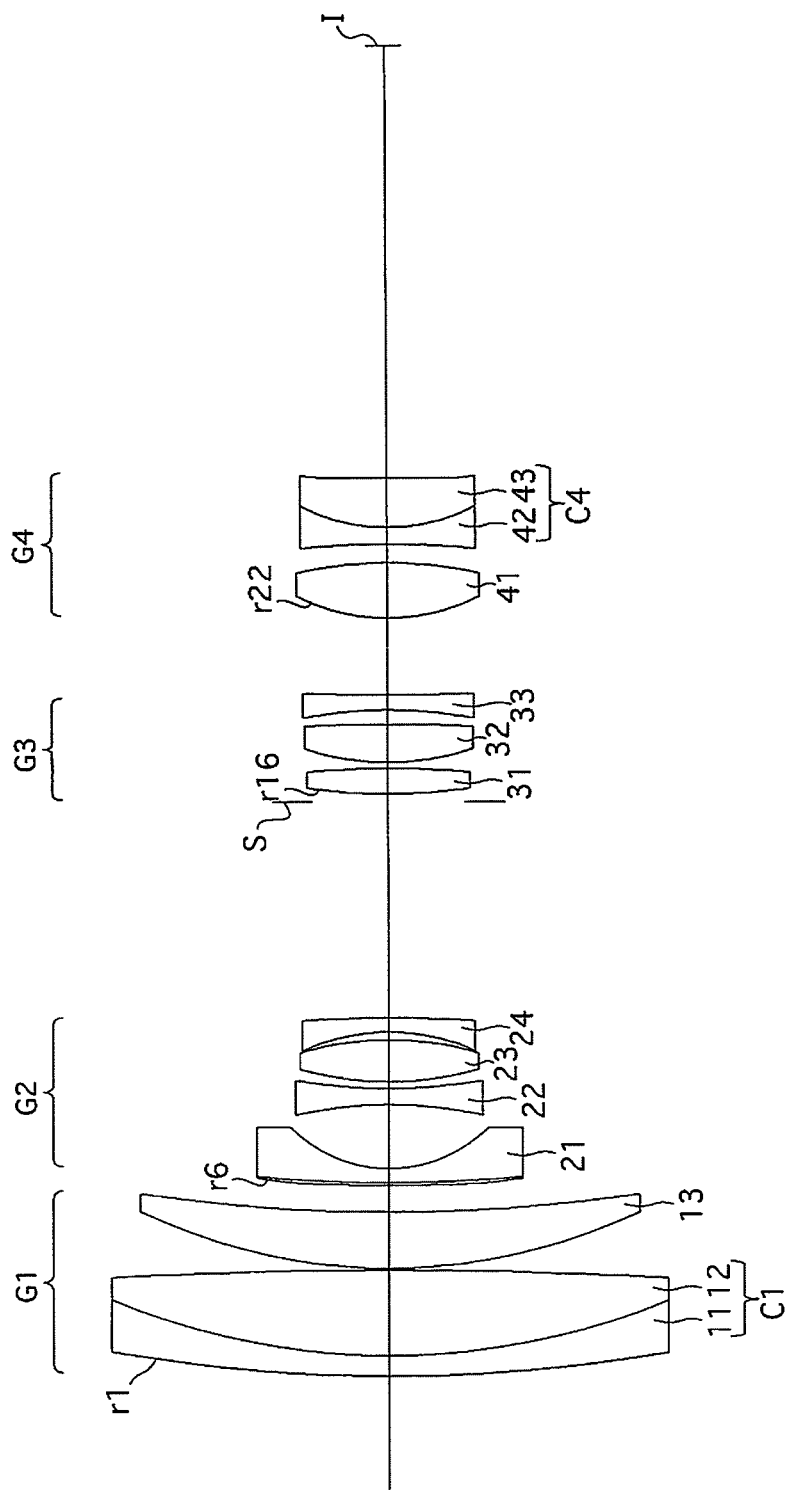
FIG. 40 shows a lens arrangement of the seventh numerical embodiment of the high zoom-ratio zoom lens system, according to the present invention, when an object at infinity is in an in-focus state at the short focal length extremity.

FIGS. 37 through 42D and Tables 25 through 28 show a seventh numerical embodiment of a high zoom-ratio zoom lens system according to the present invention. FIG. 37 shows a lens arrangement of the seventh numerical embodiment of the high zoom-ratio zoom lens system when an object at infinity is in an in-focus state at the long focal length extremity. FIGS. 38A, 38B, 38C and 38D show various aberrations that occurred in the lens arrangement shown in FIG. 37. FIGS. 39A, 39B, 39C and 39D show various lateral aberrations that occurred in the lens arrangement shown in FIG. 37. FIG. 40 shows a lens arrangement of the seventh numerical embodiment of the high zoom-ratio zoom lens system, according to the present invention when an object at infinity is in an in-focus state at the short focal length extremity. FIGS. 41A, 41B, 41C and 41D show various aberrations that occurred in the lens arrangement shown in FIG. 40. FIGS. 42A, 42B, 42C and 42D show various lateral aberrations that occurred in the lens arrangement shown in FIG. 40. Table 25 shows the lens surface data, Table 26 shows various zoom lens system data, Table 27 shows the aspherical surface data, and Table 28 shows the lens group data of the zoom lens system according to second numerical embodiment.

The fundamental lens arrangement of the seventh numerical embodiment is the same as that of the first numerical embodiment.

TABLE 25

SURFACE DATA

| Surf. No. | r | d | N(d) | vd |
|---|---|---|---|---|
| 1 | 140.454 | 1.800 | 1.84666 | 23.8 |
| 2 | 62.395 | 7.624 | 1.51680 | 64.2 |
| 3 | −437.153 | 0.150 |   |   |
| 4 | 51.428 | 4.924 | 1.77250 | 49.6 |
| 5 | 152.593 | d5 |   |   |
| 6 * | 446.390 | 0.200 | 1.52972 | 42.7 |
| 7 | 128.300 | 1.250 | 1.83481 | 42.7 |
| 8 | 12.714 | 5.616 |   |   |
| 9 | −37.804 | 1.416 | 1.83481 | 42.7 |
| 10 | 49.000 | 0.601 |   |   |
| 11 | 30.357 | 3.685 | 1.84666 | 23.8 |
| 12 | −28.149 | 0.684 |   |   |
| 13 | −19.151 | 1.250 | 1.77250 | 49.6 |

TABLE 25-continued

SURFACE DATA

| Surf. No. | r | d | N(d) | vd |
|---|---|---|---|---|
| 14 | −131.493 | d14 |   |   |
| 15(Diaphragm) | ∞ | 0.700 |   |   |
| 16 | 47.691 | 2.284 | 1.48749 | 70.4 |
| 17 | −75.610 | 0.500 |   |   |
| 18 | 24.055 | 3.330 | 1.48749 | 70.4 |
| 19 | −161.464 | 1.284 |   |   |
| 20 | −39.241 | 1.300 | 1.70154 | 41.2 |
| 21 | 251.043 | d21 |   |   |
| 22 | 18.272 | 4.863 | 1.49700 | 81.6 |
| 23 | −36.840 | 1.633 |   |   |
| 24 | −85.190 | 1.458 | 1.80440 | 39.6 |
| 25 | 17.028 | 4.410 | 1.58913 | 61.2 |
| 26 * | −176.992 | — |   |   |

The asterisk (*) designates an aspherical surface which is rotationally symmetrical with respect to the optical axis.

TABLE 26

ZOOM LENS SYSTEM DATA
Zoom Ratio 7.25

|   | Short-FLE | IFL | Long-FLE |
|---|---|---|---|
| FNO. | 3.60 | 5.27 | 5.80 |
| f | 18.60 | 69.88 | 134.90 |
| W | 38.35 | 11.17 | 5.87 |
| Y | 14.24 | 14.24 | 14.24 |
| fB | 37.866 | 62.716 | 72.361 |
| L | 116.87 | 153.43 | 168.45 |
| d5 | 2.352 | 32.800 | 44.886 |
| d14 | 18.957 | 6.600 | 1.940 |
| d21 | 6.732 | 2.542 | 2.000 |

TABLE 27

Aspherical Surface Data (the aspherical surface coefficients not indicated are zero (0.00)):

| S. No. | K | A4 | A6 | A8 |
|---|---|---|---|---|
| 6 | 0.000 | 0.3070E−04 | −0.9139E−07 | 0.2722E−09 |
|   |   | A10 |   |   |
|   |   | −0.2337E−12 |   |   |
| S. No. | K | A4 | A6 | A8 |
| 26 | 0.000 | 0.6650E−04 | 0.2357E−06 | 0.9755E−09 |

TABLE 28

LENS GROUP DATA

| Lens Group | 1st Surf. | Focal Length |
|---|---|---|
| 1 | 1 | 81.918 |
| 2 | 6 | −12.392 |
| 3 | 16 | 43.682 |
| 4 | 22 | 45.748 |

The numerical values of each condition for each numerical embodiment are shown in Table 29.

TABLE 29

|   | Embod. 1 | Embod. 2 | Embod. 3 | Embod. 4 |
|---|---|---|---|---|
| Cond. (1) | 1.12 | 0.96 | 1.05 | 0.95 |
| Cond. (2) | −3.31 | −3.83 | −3.57 | −3.57 |
| Cond. (3) | 69.53 | 64.79 | 61.47 | 68.02 |
| Cond. (4) | 0.24 | 0.23 | 0.22 | 0.22 |
| Cond. (5) | −0.642 | −0.659 | −0.662 | −0.649 |

TABLE 29-continued

|  | Embod. 5 | Embod. 6 | Embod. 7 |
|---|---|---|---|
| Cond. (1) | 1.26 | 0.95 | 1.09 |
| Cond. (2) | −3.05 | −3.82 | −3.36 |
| Cond. (3) | 61.68 | 59.84 | 64.88 |
| Cond. (4) | 0.30 | 0.22 | 0.19 |
| Cond. (5) | −0.630 | −0.651 | −0.633 |

As can be understood from Table 29, the first through seventh embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high-ratio zoom lens system comprises a positive first lens group, a negative second lens group, a positive third lens group, and a positive fourth lens group, in that order from an object,
wherein upon zooming from the short focal length extremity to the long focal length extremity, said first through fourth lens groups move along the optical axis of the high-ratio zoom lens system, the distance between said first lens group and said second lens group increases, and the distance between said second lens group and said third lens group decreases;
wherein said fourth lens group consists of a positive lens element, and a cemented lens comprising a negative lens element and a positive lens element, in that order from the object; and
wherein said high-ratio zoom lens system satisfies the following conditions:

$$0.9 < f3/f4 < 1.3$$

$$3.85 < f123t/f4 < -3.04$$

wherein
f3 designates a focal length of said third lens group,
f4 designates a focal length of said fourth lens group, and
f123t designates a combined focal length of said first lens group, said second lens group and said third lens group when an object at infinity is in an in-focus state at the long focal length extremity.

2. The high-ratio zoom lens system according to claim 1, wherein said second lens group comprises a focusing lens group; and wherein said high-ratio zoom lens system satisfies the following condition:

$$55 < R1b/d_{1-2} < 70$$

wherein
R1b designates a radius of curvature of the image-side surface of the most image-side lens element in said first lens group; and,
$d_{1-2}$ designates a distance between said first lens group and said second lens group when an object at infinity is in an in-focus state at the short focal length extremity.

3. The high-ratio zoom lens system according to claim 1, further satisfying the following condition:

$$0.15 < f4p1/ft < 0.35$$

wherein
f4p1 designates a focal length of an object-side positive lens element in said fourth lens group; and,
ft designates a entire focal length of said high-ratio zoom lens system at the long focal length extremity.

4. The high-ratio zoom lens system according to claim 1, wherein an image-side surface of said image-side positive lens element in said fourth lens group comprises an aspherical surface.

5. The high-ratio zoom lens system according to claim 1, further satisfying the following condition:

$$-0.67 < \beta 2t < -0.62,$$

wherein
β2t designates a lateral magnification of said second lens group when an object at infinity is in an in-focus state at the long focal length extremity.

6. A high-ratio zoom lens system comprises a positive first lens group, a negative second lens group, a positive third lens group, and a positive fourth lens group, in that order from an object,
wherein upon zooming from the short focal length extremity to the long focal length extremity, said first through fourth lens groups move along the optical axis of the high-ratio zoom lens system, and the distance between said first lens group and said second lens group increases, and the distance between said second lens group and said third lens group decreases;
wherein said fourth lens group consists of a positive lens element, and a cemented lens comprising a negative lens element and a positive lens element, in that order from the object; and
wherein said high-ratio zoom lens system satisfies the following conditions:

$$0.15 < f4p1/ft < 0.35$$

$$0.9 < f3/f4 < 1.3$$

wherein
f3 designates a focal length of said third lens group,
f4 designates a focal length of said fourth lens group,
f4p1 designates a focal length of said object-side positive lens element in said fourth lens group; and,
ft designates a entire focal length of said high-ratio zoom lens system at the long focal length extremity.

7. The high-ratio zoom lens system according to claim 6, wherein said second lens group comprises a focusing lens group; and wherein said high-ratio zoom lens system satisfies the following condition:

$$55 < R1b/d_{1-2} < 70$$

wherein
R1b designates a radius of curvature of the image-side surface of the most image-side lens element in said first lens group; and,
$d_{1-2}$ designates a distance between said first lens group and said second lens group when an object at infinity is in an in-focus state at the short focal length extremity.

8. The high-ratio zoom lens system according to claim 6, further satisfying the following condition:

$$-0.67 < \beta 2t < -0.62,$$

wherein
β2t designates a lateral magnification of said second lens group when an object at infinity is in an in-focus state at the long focal length extremity.

9. The high-ratio zoom lens system according to claim 6, wherein the system further satisfies the following condition:

$0.9 < f3/f4 \leq 1.26$.

10. A high-ratio zoom lens system comprises a positive first lens group, a negative second lens group, a positive third lens group, and a positive fourth lens group, in that order from the object,
    wherein upon zooming from the short focal length extremity to the long focal length extremity, said first through fourth lens groups move along the optical axis thereof, while the distance between said first lens group and said second lens group increases, and the distance between said second lens group and said third lens group decreases;
    wherein said fourth lens group consists of a positive lens element, and a cemented lens formed from a negative lens element and a positive lens element, in that order from the object; and
    wherein said high-ratio zoom lens satisfies the following conditions:

$$0.15 < f4p1/ft < 0.35$$

and $$-3.85 < f123t/f4 < -3.04$$

wherein
f4p1 designates the focal length of said object-side positive lens element in said fourth lens group;
ft designates the entire focal length of said high-ratio zoom lens system at the long focal length extremity,
f4 designates a focal length of said fourth lens group, and
f123t designates a combined focal length of said first lens group, said second lens group and said third lens group when an object at infinity is in an in-focus state at the long focal length extremity.

11. The high-ratio zoom lens system according to claim 10, wherein said second lens group comprises a focusing lens group; and wherein said high-ratio zoom lens system satisfies the following condition:

$$55 < R1b/d_{1-2} < 70$$

wherein
R1b designates a radius of curvature of the image-side surface of the most image-side lens element in said first lens group; and,
$d_{1-2}$ designates a distance between said first lens group and said second lens group when an object at infinity is in an in-focus state at the short focal length extremity.

12. The high-ratio zoom lens system according to claim 10, further satisfying the following condition:

$$-0.67 < \beta 2t < -0.62,$$

wherein
$\beta 2t$ designates a lateral magnification of said second lens group when an object at infinity is in an in-focus state at the long focal length extremity.

13. The high ration zoom lens system according to claim 10, wherein the system further satisfies the following condition:

$$0.9 < f3/f4 \leq 1.26$$

wherein
f3 designates a focal length of said third lens group,
f4 designates a focal length of said fourth lens group.

* * * * *